(12) United States Patent
Shuman et al.

(10) Patent No.: US 12,391,255 B2
(45) Date of Patent: Aug. 19, 2025

(54) SYSTEMS AND METHODS OF COLLABORATIVE ENHANCED SENSING

(71) Applicant: QUALCOMM Incorporated, San Diego, CA (US)

(72) Inventors: Mohammed Ataur Rahman Shuman, San Diego, CA (US); Bala Ramasamy, San Marcos, CA (US); Amit Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/723,393

(22) Filed: Apr. 18, 2022

(65) Prior Publication Data
US 2023/0331235 A1    Oct. 19, 2023

(51) Int. Cl.
*B60W 40/04* (2006.01)
*B60W 30/095* (2012.01)
(Continued)

(52) U.S. Cl.
CPC .......... *B60W 40/04* (2013.01); *B60W 30/095* (2013.01); *B60W 40/10* (2013.01); *B60W 50/14* (2013.01); *G01B 21/18* (2013.01); *G08G 1/16* (2013.01); *B60W 2420/403* (2013.01); *B60W 2520/06* (2013.01)

(58) Field of Classification Search
CPC .... B60W 40/04; B60W 30/095; B60W 40/10; B60W 50/14; B60W 2420/403; B60W 2520/06; G01B 21/18; G08G 1/16
See application file for complete search history.

(56) References Cited

U.S. PATENT DOCUMENTS 6,393,361 B1 *   5/2002   Yano ........................ B60T 7/14
                                                    340/436
10,048,700 B1 *  8/2018   Curlander ............ G08G 1/0116
(Continued)

OTHER PUBLICATIONS

Hobert L., et al., "Enhancements of V2X Communication in Support of Cooperative Autonomous Driving", IEEE Communications Magazine, @Bullet, Dec. 1, 2015, XP93058933, pp. 64-70.
(Continued)

*Primary Examiner* — James J Lee
*Assistant Examiner* — Steven Vu Nguyen
(74) *Attorney, Agent, or Firm* — QUALCOMM Incorporated

(57) ABSTRACT

Collaborative enhanced sensing systems and techniques are described. A system obtains sensor data of an environment from one or more sensors. The sensor data includes different representations of one or more portions of the environment from multiple perspectives. The system identifies a subset of the different representations of the one or more portions of the environment based on context corresponding to a vehicle in the environment. The context can include, for example, a position, a direction of travel, a speed, and/or a planned movement of the vehicle. The system causes an enhanced representation of the environment for the vehicle to be generated at least in part based on consolidating and/or fusing together the subset of the different representations. The system can cause an indication of the enhanced representation of the environment to be output at the vehicle.

33 Claims, 11 Drawing Sheets

(51) Int. Cl.
    *B60W 40/10*     (2012.01)
    *B60W 50/14*     (2020.01)
    *G01B 21/18*     (2006.01)
    *G08G 1/16*     (2006.01)

(56) References Cited

U.S. PATENT DOCUMENTS

| | | |
|---|---|---|
| 10,057,604 B2 | 8/2018 | Von Novak et al. |
| 11,037,443 B1 | 6/2021 | Cui et al. |
| 2020/0042832 A1* | 2/2020 | Kim .................. G06F 18/217 |
| 2020/0413264 A1* | 12/2020 | Han .................. H04W 12/122 |
| 2021/0221396 A1* | 7/2021 | Awano .................. B60K 35/00 |
| 2022/0032970 A1* | 2/2022 | Vadivelu .................. G06N 3/045 |
| 2022/0185266 A1* | 6/2022 | Shah .................. B60W 30/0956 |

OTHER PUBLICATIONS

International Search Report and Written Opinion—PCT/US2023/065461—ISA/EPO—Jul. 6, 2023.

\* cited by examiner

SYSTEMS AND METHODS OF COLLABORATIVE ENHANCED SENSING

FIELD

This application is related to sensor data processing. More specifically, this application relates to systems and methods of collaborative enhanced sensing to indicate relevant information about an environment to a recipient device, such as a vehicle, that is in the environment.

BACKGROUND

Vehicular collisions are some of the most common causes of death or serious injuries worldwide. While vehicle technologies have improved over time, vehicles still have blind spots that drivers have difficulty seeing or sometimes cannot see at all, and that can cause vehicular collisions. Sometimes, situations may occur when a view from a vehicle may be blocked by an object, such as a building or a large truck, causing the driver of the vehicle to have difficulty sensing an important aspect of the environment. This, too, might cause a vehicular collision.

BRIEF SUMMARY

In some examples, systems and techniques are described for collaborative enhanced sensing. A collaborative enhanced sensing system obtains sensor data of an environment from one or more sensors of at least one device, for instance using a transceiver. The sensor data includes a plurality of different representations of one or more portions of the environment from a plurality of perspectives. The collaborative enhanced sensing system identifies a subset of the plurality of different representations of the one or more portions of the environment based on context corresponding to a vehicle in the environment. The context can include, for example, a position, a direction of travel, a speed, and/or a planned movement of the vehicle. The collaborative enhanced sensing system causes an enhanced view of the environment for the vehicle to be generated at least in part based on consolidating and/or fusing together the subset of the plurality of different representations. The enhanced representation of the environment can include a representation of a portion of the environment that is difficult to sense from a perspective of the vehicle, for instance due to an occlusion, an environmental scene condition, a sensor condition, or some combination thereof. The collaborative enhanced sensing system can cause an indication of the enhanced representation of the environment to be output at the vehicle, such as an alert that is based on the enhanced representation of the environment. Such an alert can warn the vehicle and/or its operator about a likely collision between the vehicle and another object in the environment.

In one example, an apparatus for media processing is provided. The apparatus includes a memory and one or more processors (e.g., implemented in circuitry) coupled to the memory.

The one or more processors are configured to and can: obtain sensor data of an environment from one or more sensors, wherein the sensor data includes a plurality of different representations of one or more portions of the environment from a plurality of perspectives; identify a subset of the plurality of different representations of the one or more portions of the environment based on context corresponding to a vehicle in the environment, wherein the context includes at least a position of the vehicle in the environment; and cause an enhanced representation of the environment for the vehicle to be generated at least in part based on consolidating the subset of the plurality of different representations.

In another example, a method of image processing is provided. The method includes: obtaining sensor data of an environment from one or more sensors, wherein the sensor data includes a plurality of different representations of one or more portions of the environment from a plurality of perspectives; identifying a subset of the plurality of different representations of the one or more portions of the environment based on context corresponding to a vehicle in the environment, wherein the context includes at least a position of the vehicle in the environment; and causing an enhanced representation of the environment for the vehicle to be generated at least in part based on consolidating the subset of the plurality of different representations.

In another example, a non-transitory computer-readable medium is provided that has stored thereon instructions that, when executed by one or more processors, cause the one or more processors to: obtain sensor data of an environment from one or more sensors, wherein the sensor data includes a plurality of different representations of one or more portions of the environment from a plurality of perspectives; identify a subset of the plurality of different representations of the one or more portions of the environment based on context corresponding to a vehicle in the environment, wherein the context includes at least a position of the vehicle in the environment; and cause an enhanced representation of the environment for the vehicle to be generated at least in part based on consolidating the subset of the plurality of different representations.

In another example, an apparatus for image processing is provided. The apparatus includes: means for obtaining sensor data of an environment from one or more sensors, wherein the sensor data includes a plurality of different representations of one or more portions of the environment from a plurality of perspectives; means for identifying a subset of the plurality of different representations of the one or more portions of the environment based on context corresponding to a vehicle in the environment, wherein the context includes at least a position of the vehicle in the environment; and means for causing an enhanced representation of the environment for the vehicle to be generated at least in part based on consolidating the subset of the plurality of different representations.

In some aspects, identifying the subset of the plurality of different representations based on the context includes identifying one or more representations of a portion of the environment that includes the position of the vehicle. In some aspects, the context includes a direction of travel of the vehicle in the environment, wherein identifying the subset of the plurality of different representations based on the context includes identifying one or more representations of a portion of the environment ahead of the vehicle in the direction of travel of the vehicle. In some aspects, the context includes a speed of the vehicle in the environment, wherein identifying the subset of the plurality of different representations based on the context includes identifying one or more representations of a portion of the environment ahead of the vehicle, wherein a size of the portion of the environment is based on speed of the vehicle.

In some aspects, the context includes a planned movement of the vehicle in the environment, wherein identifying the subset of the plurality of different representations based on the context includes identifying one or more representations of a portion of the environment ahead of the vehicle according to the planned movement of the vehicle. In some aspects, one or more of the methods, apparatuses, and computer-readable medium described above further comprise: detecting an indicator light of the vehicle in the sensor data; and determining the planned movement of the vehicle based on detecting the indicator light of the vehicle in the sensor data, wherein the planned movement of the vehicle is a turn. In some aspects, one or more of the methods, apparatuses, and computer-readable medium described above further comprise: receiving an indication of the planned movement of the vehicle from the vehicle, wherein the planned movement of the vehicle is part of a planned route for the vehicle.

In some aspects, the context includes an object in the environment other than the vehicle, wherein to identifying the subset of the plurality of different representations based on the context includes identifying one or more representations of a portion of the environment that includes the object. In some aspects, one or more of the methods, apparatuses, and computer-readable medium described above further comprise: identifying, based on one or more planned movements of the vehicle, a risk of a collision between the vehicle and the object; and causing an alert that is based on the enhanced representation of the environment to be output at the vehicle, wherein the alert indicates the risk of the collision between the vehicle and the object. In some aspects, the context includes a planned movement of an object in the environment other than the vehicle, wherein identifying the subset of the plurality of different representations based on the context includes identifying one or more representations of a portion of the environment ahead of the vehicle according to the planned movement of the object.

In some aspects, identifying the subset of the plurality of different representations based on the context includes identifying that confidence levels associated with each of the subset of the plurality of different representations exceed a confidence level threshold, wherein a confidence level of one of the plurality of different representations is associated with confidence that the one of the plurality of different representations representing a portion of the environment ahead of the vehicle. In some aspects, the portion of the environment ahead of the vehicle includes the vehicle. In some aspects, the confidence level is based on a resolution of the one of the plurality of different representations. In some aspects, the confidence level is based on a level of illumination in the one of the plurality of different representations. In some aspects, the confidence level is based on object detection using the one of the plurality of different representations.

In some aspects, receiving the sensor data of the environment includes receiving at least a portion of the sensor data that includes at least one of the plurality of different representations from a second vehicle in the environment. In some aspects, receiving the sensor data of the environment includes receiving at least a portion of the sensor data that includes at least one of the plurality of different representations from a roadside unit (RSU) in the environment. In some aspects, receiving the sensor data of the environment includes receiving at least a portion of the sensor data that includes at least one of the plurality of different representations from a camera in the environment. In some aspects, receiving the sensor data of the environment includes receiving at least a portion of the sensor data that includes at least one of the plurality of different representations from a sensor of the vehicle. In some aspects, the plurality of different representations include depth data captured using at least one depth sensor. In some aspects, the plurality of different representations include image data captured using at least one image sensor.

In some aspects, one or more of the methods, apparatuses, and computer-readable medium described above further comprise: receiving traffic data from a traffic management controller, wherein the context includes at least a portion of the traffic data, wherein the portion of the traffic data is associated with at least a portion of the environment that includes the vehicle.

In some aspects, causing the enhanced representation of the environment for the vehicle to be generated at least in part based on consolidating the subset of the plurality of different representations includes fusing together at least two different representations of the subset of the plurality of different representations. In some aspects, the at least two different representations include an image captured by an image sensor and a depth dataset captured by a depth sensor, and wherein fusing together the at least two different representations includes associating portions of the image with corresponding portions of the depth dataset that represent corresponding portions of the environment.

In some aspects, identifying the subset of the plurality of different representations based on the context corresponding to the vehicle in the environment includes inputting the sensor data and the context into one or more trained machine learning models that output an indication of the subset of the plurality of different representations. In some aspects, one or more of the methods, apparatuses, and computer-readable medium described above further comprise: identifying a reaction of the vehicle in response to receiving the enhanced representation of the environment; and updating the one or more trained machine learning models using the context, the subset of the plurality of different representations, and the reaction as training data.

In some aspects, obtaining the sensor data of the environment from the one or more sensors includes obtaining the sensor data of the environment from the one or more sensors using at least one of a receiver, a transceiver, and/or a communication interface. In some aspects, obtaining the sensor data of the environment from the one or more sensors includes obtaining the sensor data of the environment from at least one device that includes at least one of the one or more sensors. In some aspects, the at least one device is non-co-located with the apparatus. In some aspects, obtaining the sensor data of the environment from the one or more sensors includes obtaining the sensor data of the environment from a plurality of devices that include at least one of the one or more sensors. In some aspects, the plurality of devices are non-co-located with one another.

In some aspects, identifying the subset of the plurality of different representations of the one or more portions of the environment based on the context includes identifying the subset of the plurality of different representations of the one or more portions of the environment without any user input. In some aspects, identifying the subset of the plurality of different representations of the one or more portions of the environment based on the context includes identifying the subset of the plurality of different representations of the one or more portions of the environment based on a selection by a user using a user interface. In some aspects, identifying the subset of the plurality of different representations of the one or more portions of the environment based on the context includes identifying the subset of the plurality of different representations of the one or more portions of the environment based on preference associated with a user.

In some aspects, at least a first representation of the plurality of different representations is received from a first vehicle, and at least a second representation of the plurality of different representations is received from a second vehicle. In some aspects, at least a first representation of the plurality of different representations is received from a first vehicle, and at least a second representation of the plurality of different representations is received from at least one of a roadside unit (RSU), a multi-access edge computing (MEC) system, or a traffic management controller (TMC). In some aspects, at least a first representation of the plurality of different representations is received from a first roadside unit (RSU), and at least a second representation of the plurality of different representations is received from a second RSU. In some aspects, at least a first representation of the plurality of different representations is received from the vehicle, and at least a second representation of the plurality of different representations is received from a second vehicle. In some aspects, at least a first representation of the plurality of different representations is received from the vehicle, and at least a second representation of the plurality of different representations is received from at least one of a roadside unit (RSU), a multi-access edge computing (MEC) system, or a traffic management controller (TMC).

In some aspects, the apparatus includes a computing device that is remote from the vehicle, further comprising: identifying the vehicle in the environment before causing the enhanced representation of the environment for the vehicle to be generated; and sending an indication of the enhanced representation of the environment to the vehicle. In some aspects, the computing device of the apparatus is one of a multi-access edge computing (MEC) system, a roadside unit (RSU) system, a remote server, or a vehicle computing device, wherein the vehicle computing device is part of a second vehicle in the environment.

In some aspects, the apparatus includes a vehicle computing device of the vehicle, further comprising: outputting an indication of the enhanced representation of the environment using an output device of the vehicle.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
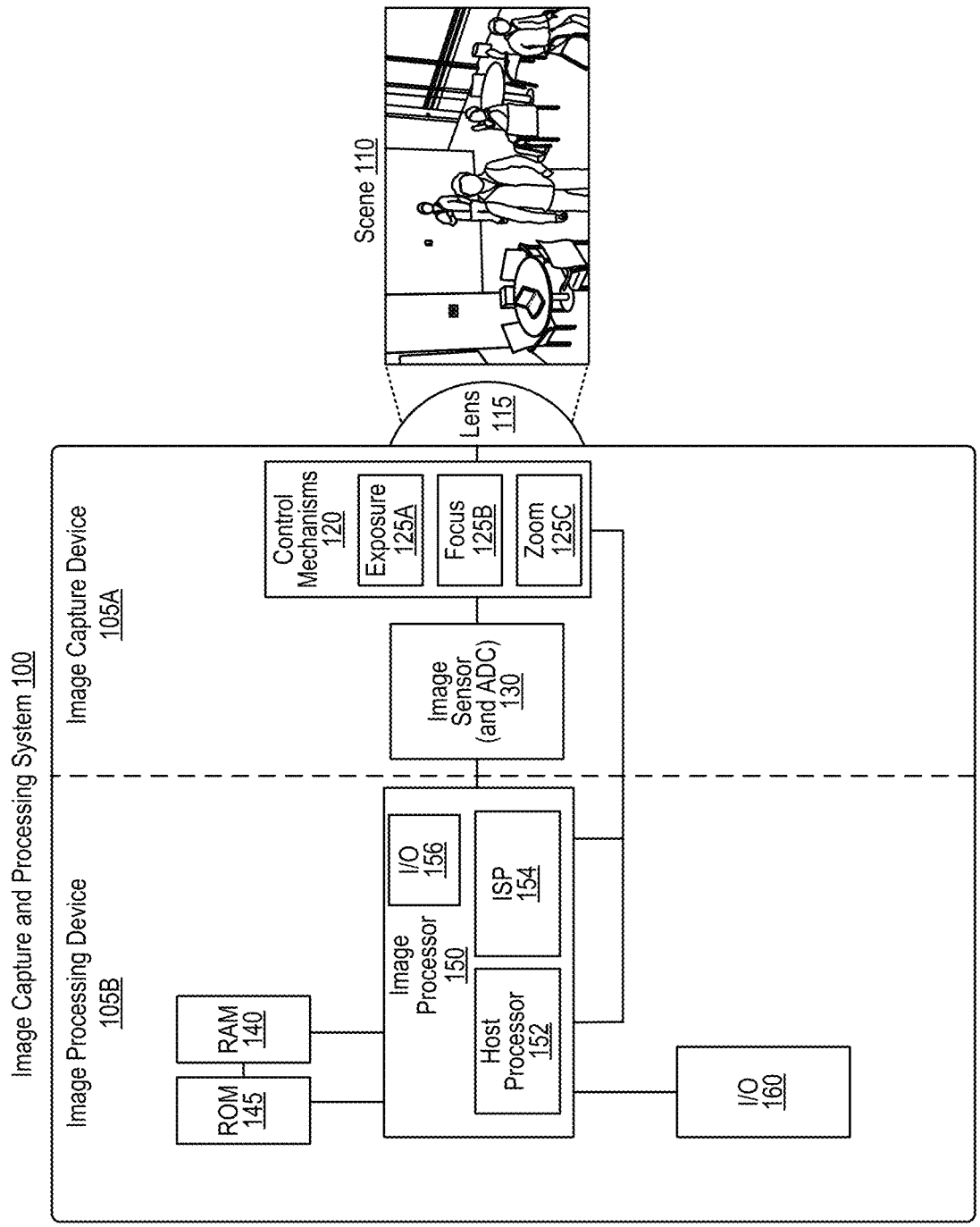
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Vehicular collisions are some of the most common causes of death or serious injuries worldwide. While vehicle technologies have improved over time, vehicles still have blind spots that drivers have difficulty seeing or sometimes cannot see at all, and that can cause vehicular collisions. Sometimes, situations may occur when a view from a vehicle may be blocked by an object, such as a building or a large truck, causing the driver of the vehicle to have difficulty sensing an important aspect of the environment. This, too, might cause a vehicular collision. Even vehicles with sensors may be unable to sense certain situations in the environment that might cause vehicular collisions, for instance if the situation in the environment is outside of the field of view of the sensor because the field of view of the sensor is blocked by another vehicle.

In some examples, systems and techniques are described for collaborative enhanced sensing. A collaborative enhanced sensing system obtains sensor data of an environment from one or more sensors. The sensor data includes a plurality of different representations of one or more portions of the environment from a plurality of perspectives. In some examples, the collaborative enhanced sensing system identifies a vehicle in the environment. The collaborative enhanced sensing system identifies a subset of the plurality of different representations of the one or more portions of the environment based on context corresponding to the vehicle in the environment. The context can include, for example, a position, a direction of travel, a speed, and/or a planned movement of the vehicle. The collaborative enhanced sensing system causes an enhanced view of the environment for the vehicle to be generated at least in part based on consolidating and/or fusing together the subset of the plurality of different representations. The enhanced representation of the environment can include a representation of a portion of the environment that is difficult to sense from a perspective of the vehicle, for instance due to an occlusion, an environmental scene condition, a sensor condition, or some combination thereof. The collaborative enhanced sensing system can cause an indication of the enhanced representation of the environment to be output at the vehicle, such as an alert that is based on the enhanced representation of the environment. Such an alert can warn the vehicle and/or its operator about a likely collision between the vehicle and another object in the environment.

The collaborative enhanced sensing systems and techniques described herein provide a number of technical improvements over prior vehicular systems, sensor systems, and communications systems. For instance, the collaborative enhanced sensing systems and techniques described herein can provide additional functionality for vehicles, providing improvements to safety of vehicular travel by providing enhanced representations and/or alerts to a vehicle that are customized to the vehicle based on portions of the environment that may be difficult or impossible to sensor from the perspective of the vehicle.

Figure 2:
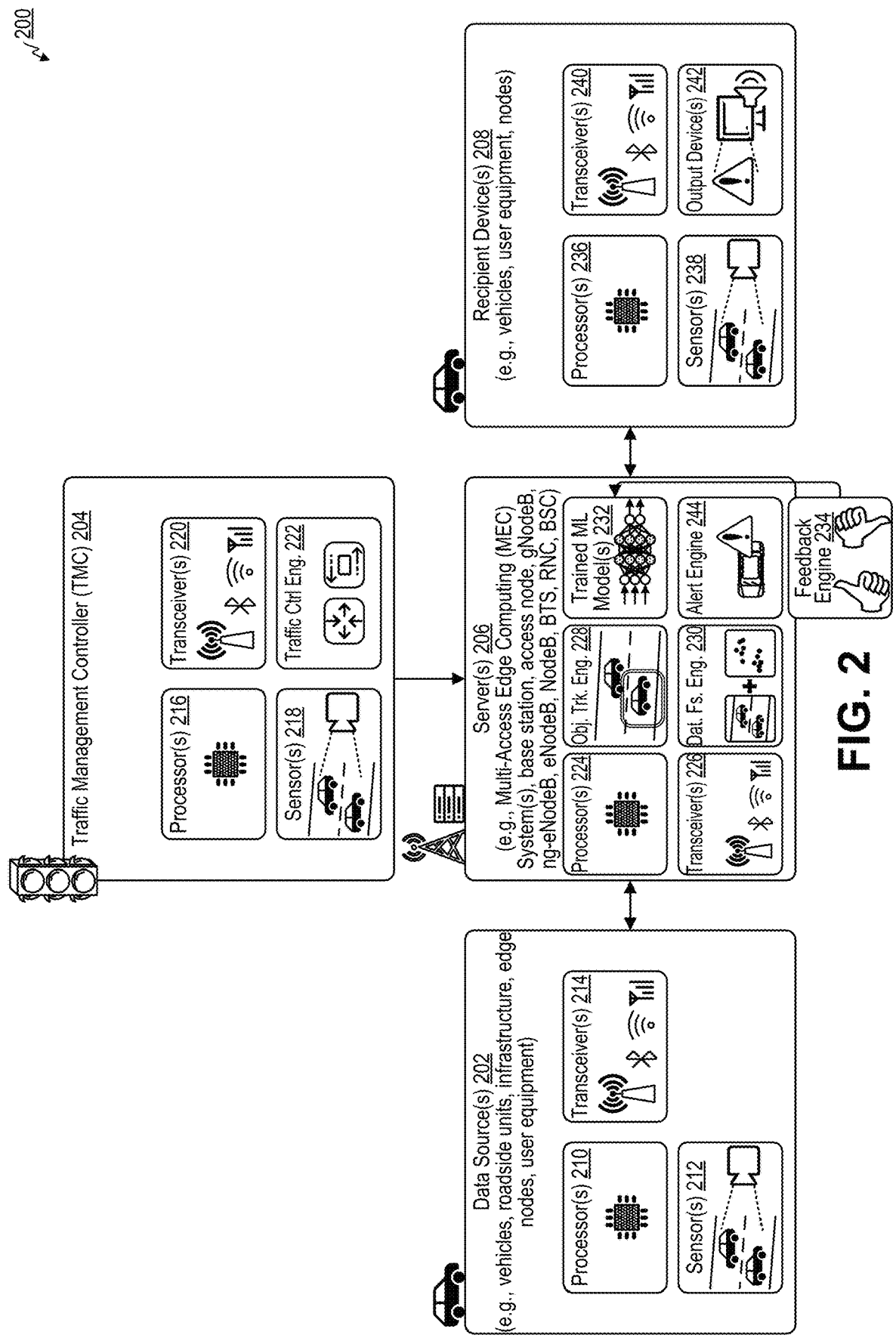
FIG. 2 is a block diagram illustrating an example architecture of a collaborative enhanced sensing system performing a process for collaborative enhanced sensing, in accordance with some examples.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user, such as a user that the sensor(s) 212, sensor(s) 218, and/or sensor(s) 238 of FIG. 2 are facing. For instance, the scene 110 can be a scene of one or both of the user's eyes, and/or at least a portion of the user's face. In some examples, the scene 110 is a scene of at least a portion of an environment, such as an environment that the sensor(s) 212, sensor(s) 218, and/or sensor(s) 238 of FIG. 2 are facing. In some examples, the scene 110 is a scene of at least a vehicle, such as a vehicle that the sensor(s) 212, sensor(s) 218, and/or sensor(s) 238 of FIG. 2 are facing.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1110 discussed with respect to the computing system 1100. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1120, read-only memory (ROM) 145 and/or 1125, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1135, any other input devices 1145, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1102.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

FIG. 2 is a block diagram illustrating an example architecture of a collaborative enhanced sensing system 200 performing a process for collaborative enhanced sensing. The collaborative enhanced sensing system 200, and the corresponding imaging process, can be used in vehicle management, autonomous vehicle control, vehicle-to-vehicle (V2V) communication systems, vehicle-to-infrastructure (V2I) communication systems, vehicle-to-network (V2N) communication systems, vehicle-to-pedestrian (V2P) communication systems, vehicle-to-everything (V2X) communication systems, cellular communication network systems, 5G network communication systems, multi-access edge computing (MEC) systems, or combinations thereof.

The collaborative enhanced sensing system 200 includes one or more data sources 202, one or more traffic management controllers (TMCs) 204, one or more servers 206, and one or more recipient devices 208. Each of the data source(s) 202, TMC(s) 204, server(s) 206, and recipient device(s) 208 can include at least one computing system 1100. Each of the data source(s) 202, TMC(s) 204, server(s) 206, and recipient device(s) 208 can include, for instance, one or more vehicles, vehicle computers, vehicle controllers, laptops, phones, tablet computers, mobile handsets, video game consoles, vehicle computers, desktop computers, wearable devices, televisions, media centers, XR systems, other types of computing devices discussed herein, or combinations thereof. In some examples, the data source(s) 202 include one or more of the components illustrated in the TMC(s) 204, the server(s) 206, and/or the recipient device(s) 208.

In some examples, the TMC(s) 204 include one or more of the components illustrated in the data source(s) 202, the server(s) 206, and/or the recipient device(s) 208. In some examples, the server(s) 206 include one or more of the components illustrated in the data source(s) 202, the TMC(s) 204, and/or the recipient device(s) 208. In some examples, the recipient device(s) 208 include one or more of the components illustrated in the data source(s) 202, the TMC(s) 204, and/or the server(s) 206.

Each of the data source(s) 202, TMC(s) 204, server(s) 206, and recipient device(s) 208 can include one or more processors 1110. For instance, the data source(s) 202 include the processor(s) 210, the TMC(s) 204 include the processor(s) 216, the server(s) 206 include the processor(s) 224, and the recipient device(s) 208 include the processor(s) 236. Each of the processor(s) 210, the processor(s) 216, the processor(s) 224, and the processor(s) 236 includes one or more processors 1110.

Each of the data source(s) 202, TMC(s) 204, server(s) 206, and recipient device(s) 208 can include one or more communication interfaces 1140. For instance, the data source(s) 202 include the transceiver(s) 214, the TMC(s) 204 include the transceiver(s) 220, the server(s) 206 include the transceiver(s) 226, and the recipient device(s) 208 include the transceiver(s) 240. Each of the transceiver(s) 214, the transceiver(s) 220, the transceiver(s) 226, and the transceiver(s) 240 includes one or more communication interfaces 1140. Each of the transceiver(s) 214, the transceiver(s) 220, the transceiver(s) 226, and the transceiver(s) 240 can include one or more wired receiver(s), transmitter(s), and/or transceiver(s), for instance using interfaces such as universal serial bus (USB), Apple® Lightning®, Ethernet, local area network (LAN) connections, general purpose input/output (GPIO) pins, audio jacks, auxiliary jacks, other wired interfaces described herein (e.g., with respect to the communication interfaces 1140 or otherwise), or combinations thereof. Each of the transceiver(s) 214, the transceiver(s) 220, the transceiver(s) 226, and the transceiver(s) 240 can include one or more wireless receiver(s), transmitter(s), and/or transceiver(s), for instance using interfaces such as Wi-Fi, wireless local area network (WLAN), cellular networks, MEC networks, 5G networks, Bluetooth®, personal area networks (PAN), near field communications (NFC), radio frequency identification (RFID), infrared, visible light communication (VLC), other wireless communication interfaces described herein (e.g., with respect to the communication interfaces 1140 or otherwise), or combinations thereof.

Each of the data source(s) 202, TMC(s) 204, and recipient device(s) 208 can include one or more sensors. For instance, the data source(s) 202 include the sensor(s) 212, the TMC(s) 204 include the sensor(s) 218, and the recipient device(s) 208 include the sensor(s) 238. In some examples. the server(s) 206 also include one or more sensors. Each of the sensor(s) 212, the sensor(s) 218, and the sensor(s) 238 can include one or more one or more cameras, image sensors, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, ultrasound sensors, rangefinders, depth sensors, other sensors discussed herein, input devices 1145, communication interfaces 1140, or combinations thereof. The term depth sensors may refer to LIDAR sensors, RADAR sensors, SODAR sensors, SONAR sensors, ToF sensors, structured light sensors, ultrasound sensors, rangefinders, or combinations thereof. In some cases, depth sensors may be referred to as range sensors or distance sensors. In some aspects, one or more of the sensor(s) may be used to complement or refine sensor readings from other sensor(s). For example, Inertial Measurement Units (IMUs), accelerometers, gyroscopes, or other sensors may be used (e.g., by the object tracking engine 228 and/or the data fusion engine 230) to refine object detection, object recognition, object tracking, and/or sensor data fusion using data from other sensor(s).

The data source(s) 202 capture sensor data using the sensor(s) 212. In some examples, the sensor(s) 212 of different data sources 202 can capture sensor data that includes representations of different portions of an environment. In some examples, the sensor(s) 212 of different data sources 202 can capture sensor data that includes representations of the environment from different perspectives. For instance, the perspectives and/or portions may be based on the pose—position (e.g., 3D coordinates) and/or orientation (e.g., pitch, yaw, and/or roll)—of the data source(s) 202 and/or the sensor(s) 212 of the data source(s) 202. Examples of the data source(s) 202 include vehicle(s) with sensor(s) 212, roadside unit(s) (RSU(s)) with sensor(s) 212, network infrastructure with sensor(s) 212, traffic infrastructure with sensor(s) 212, buildings with sensor(s) 212, edge nodes with sensor(s) 212 in a cellular network, user equipment (UE) with sensor(s) 212 in a cellular network, or combinations thereof. In some examples, the environment may include the data source(s) 202, the TMC(s) 204, the server(s) 206, the recipient device(s) 208, or a combination thereof.

The data source(s) 202 may use the processor(s) 210 to process the sensor data captured by the sensor(s) 212 The data source(s) 202 may use the processor(s) 210 to actuate motors and/or components of the sensor(s) 212 to direct the sensor(s) 212 toward (e.g., point the sensor(s) 212 toward and/or focus the sensor(s) 212 on) a particular portion of the environment capture sensor data representing that particular portion of the environment. For instance, if the environment includes a specific recipient device 208 of interest (e.g., a vehicle of interest), the data source(s) 202 may use the processor(s) 210 to direct the sensor(s) 212 toward a portion of the environment that includes the recipient device 208 of interest (e.g., the vehicle of interest) and/or toward a portion of the environment ahead of the recipient device 208 of interest (e.g., the vehicle of interest), for instance based on the direction, speed, and/or planned movement(s) of the recipient device 208 of interest (e.g., the vehicle of interest).

The data source(s) 202 may use the transceiver(s) 214 to send the sensor data captured by the sensor(s) 212 to the server(s) 206, in some cases after the sensor data is processed using the processor(s) 210. The transceiver(s) 214 may send the sensor data from the data source(s) 202 to the server(s) 206 over a wired connection, a wireless connection, or a combination thereof.

The traffic management controller(s) (TMC(s)) 204 may also include sensor(s) 218. The sensor(s) 218 of the TMC(s) 204 may include any of the types of sensors, or combinations thereof, described with respect to the sensor(s) 212 The TMC(s) 204 may capture any of the types of sensor data using the sensor(s) 218 as described with respect to the capture of sensor data by the data source(s) 202 using the sensor(s) 212. The TMC(s) 204 may include processor(s) 216, which may process the sensor data from the sensor(s) 218 as described with respect to the processor(s) 210 and the sensor(s) 212. The TMC(s) 204 may use the processor(s) 216 to direct the sensor(s) 218 as described with respect to the processor(s) 210 and the sensor(s) 212.

The TMC(s) 204 also include a traffic control engine 222. The traffic control engine 222 may receive, capture, and/or generate traffic data. The TMC(s) 222 may include devices for various traffic management applications, such as traffic lights for controlling traffic at intersections, electronic toll collection devices for collecting tolls, electronic speed limit display signs, city surveillance devices for monitoring traffic throughout a city, road surveillance devices for monitoring traffic along particular roads, license plate recognition devices for recognizing individual vehicles, public transit stops where passengers embark onto or disembark from public transit vehicles, roadside units (RSUs), or combinations thereof. In some examples, the traffic control engine 222 of the TMC(s) 204 may receive, capture, and/or generate traffic data that controls when traffic is permitted to, and/or is not permitted to (e.g., is prohibited from), traverse a particular stretch of road, such as an intersection, for instance using traffic light(s) of the TMC(s) 204. The traffic data can, for instance, indicate timing for one or more traffic lights dynamically, so that stop lights are minimized for vehicles driving along a main thoroughfare of a city, to ensure that pedestrians have sufficient time to walk across intersections, to ensure that vehicles can turn safely, or combinations thereof. In some examples, the traffic data can dynamically change speed limits on electronic speed limit display signs, for instance reducing speed limits to increase safety around schools at times when the school is starting or ending for the day, increasing speed limits during peak traffic times (e.g., rush hour) to reduce traffic, and the like. In some examples, the traffic data can dynamically change tolls, for instance increasing tolls to discourage use of certain roadways during times when such roadways are experiencing heavy traffic or decreasing tolls to encourage use of certain roadways when such roadways are experiencing light traffic. In some examples, the traffic data can monitor which roads and/or areas of a region (e.g., a city) have heavy traffic or light traffic at a given past or present time. In some examples, the traffic data can predict which roads and/or areas of a region (e.g., a city) have heavy traffic or light traffic at a given future time. In some examples, the traffic data from the traffic control engine 222 may detect, monitor, and/or track attributes (e.g., position, speed, movement direction, acceleration, deceleration) of a particular vehicle (e.g., that may be one of the recipient device(s) 208) within the environment.

The TMC(s) 204 may use the transceiver(s) 220 to send the sensor data captured by the sensor(s) 218 to the server(s) 206, in some cases after the sensor data is processed and/or combined with traffic data using the processor(s) 216. The TMC(s) 204 may use the transceiver(s) 220 to send traffic data captured and/or generated by the traffic control engine 222 to the server(s) 206, in some cases after the traffic data is processed and/or combined with the sensor data using the processor(s) 216. The transceiver(s) 220 may send the sensor data and/or the traffic data from the TMC(s) 204 to the server(s) 206 over a wired connection, a wireless connection, or a combination thereof. The transceiver(s) 220 may include components discussed with respect to the transceiver(s) 214, and/or may function as discussed with respect to the transceiver(s) 214.

The recipient device(s) 208 may include, for instance, vehicles, UEs, edge nodes, mobile handsets, wearable devices, head-mounted display (HMD) devices (e.g., for augmented reality (AR), virtual reality (VR), mixed reality (MR), and/or extended reality (XR)), any other type of computing system 1100, or a combination thereof. The recipient device(s) 208 can be associated with vehicles, pedestrians, bikers, infrastructure, or combinations thereof. In some examples, one or more of the recipient device(s) 208 may also be one of the data source(s) 202. The recipient device(s) 208 can include sensor(s) 238. The sensor(s) 238 of the recipient device(s) 208 may include any of the types of sensors, or combinations thereof, described with respect to the sensor(s) 212 and/or the sensor(s) 218. The recipient device(s) 208 may capture any of the types of sensor data using the sensor(s) 238 as described with respect to the capture of sensor data using the sensor(s) 212 and/or the sensor(s) 218. The recipient device(s) 208 may include processor(s) 236, which may process the sensor data from the sensor(s) 238 as described with respect to the processor(s) 210 and the sensor(s) 212, and/or the processor(s) 216 and the sensor(s) 218. The recipient device(s) 208 may use the processor(s) 236 to direct the sensor(s) 238 as described with respect to the processor(s) 210 and the sensor(s) 212, and/or the processor(s) 216 and the sensor(s) 218.

The recipient device(s) 208 may use the transceiver(s) 240 to send the sensor data captured by the sensor(s) 238 to the server(s) 206, in some cases after the sensor data is processed and/or combined with traffic data using the processor(s) 236. The transceiver(s) 240 may send the sensor data from the recipient device(s) 208 to the server(s) 206 over a wired connection, a wireless connection, or a combination thereof. The transceiver(s) 240 may include components discussed with respect to the transceiver(s) 214 and/or the transceiver(s) 220, and/or may function as discussed with respect to the transceiver(s) 214 and/or the transceiver(s) 220.

Examples of the server(s) 206 include one or more MEC systems, base stations, access nodes, telecommunications nodes, Node Bs, enhanced Node Bs (eNodeBs), next-generation Node Bs (gNodeBs), base transceiver stations (BTSs), radio network controllers (RNCs), base station controllers (BSCs), servers of any type, computing systems 1100 of any type, or combinations thereof.

The server(s) 206 include an object tracking engine 228 that can extract features from input data, detect objects in the input data, recognize objects in the input data, and/or track the objects in the input data. The input data can include sensor data (e.g., sensor data captured by the sensor(s) 212, sensor data captured by the sensor(s) 218, sensor data captured by the sensor(s) 238), traffic data (e.g., captured, received, and/or generated by the traffic control engine 222), processing data (e.g., regarding processing of other input data performed by the processor(s) 210, the processor(s) 216, the processor(s) 224, and/or the processor(s) 236), or combinations thereof. The server(s) 206 can include one or more trained machine learning (ML) models 232. In some examples, the object tracking engine 228 inputs the input data into the trained ML model(s) 232 to perform, based on the input data, feature extraction, feature detection, feature recognition, feature tracking, object detection, object recognition, object tracking, facial detection, facial recognition, facial tracking, person detection, person recognition, person tracking, vehicle detection, vehicle recognition, vehicle tracking, device detection, device recognition, device tracking, or a combination thereof. The trained ML model(s) 232 used by the object tracking engine 228 can be trained (e.g., by the server(s) 206) using training data that includes the same types of data as described with respect to the input data, with indications of pre-identified features, objects, people, faces, vehicles, devices, and/or other detectable, recognizable, and/or trackable content. In some examples, the object tracking engine 228 can also output a confidence level regarding detection, recognition, and/or tracking of an object in the input data. In some examples, the object tracking engine 228 discards detection, recognition, and/or tracking of an object in the input data if the confidence level falls below (and/or does not exceed) a predetermined confidence level threshold. In some examples, the object tracking engine 228 can perform object detection, detection, recognition, and/or tracking based on sensor data (e.g., image data captured by image sensor(s) and/or depth data captured by depth sensor(s)). In some examples, the object tracking engine 228 can perform object detection, detection, recognition, and/or tracking based on traffic data (e.g., the traffic data from the traffic control engine 222). In some examples, the object tracking engine 228 can perform object detection, detection, recognition, and/or tracking based on data received from transceiver(s) 240 of the recipient device(s) 208, for instance positioning receiver data and/or IMU data of a recipient device 208 if the recipient device 208 is the object being tracked. In some examples, the object tracking engine 228 can perform object detection, detection, recognition, and/or tracking based on a combination of sensor data and traffic data.

In some examples, the object tracking engine 228 can identify a position of an object, such as a vehicle. In some examples, the object tracking engine 228 can identify various attributes of movement of an object, such as a vehicle. For instance, the object tracking engine 228 can identify direction of movement of the object, speed of movement of the object, acceleration rate of the object, deceleration rate of the object, whether the object is turning, an extent to which the object is turning (e.g., turning angle and/or turning radius), or a combination thereof. In some examples, the object tracking engine 228 can one or more planned movements of the object. For instances if the object is a vehicle, the object tracking engine 228 can detect and track illumination of indicator lights to determine a planned movement. For instance, the object tracking engine 228 can detect and track illumination of the vehicle's turning indicator lights, indicating a planned movement—that the vehicle plans to turn in an indicated direction, merge/change into a different lane, pull over, and/or park. The object tracking engine 228 can detect and track illumination of the vehicle's brake lights, indicating a planned movement—that the vehicle is decelerating, and likely plans to continue to decelerate. The object tracking engine 228 can detect and track illumination of the vehicle's hazard lights, indicating a planned movement—that the vehicle is planning to decelerate, drive slowly, and/or stop. In some examples, the object tracking engine 228 can detect and track a planned movement of a vehicle based on data received from the vehicle itself (e.g., data received from the transceiver(s) 240 of the recipient device(s) 208). For instance, if the vehicle is autonomous or includes certain autonomous or semi-autonomous features, the vehicle may have a planned route (or a portion thereof) that the vehicle may send to the server(s) 206, and that the object tracking engine 228 can use to determine planned movement(s) of the vehicle. The planned movement(s) of the vehicle can be used by the object tracking engine 228 to better predict where the vehicle will be at a given future time, and to thus better track the vehicle through the environment based on this.

The server(s) 206 include a data fusion engine 230. The data fusion engine 230 can consolidate and/or fuse together different input datasets to generate an output dataset made up of consolidated and/or fused data. The input datasets may include, for instance, the sensor data captured by the sensor(s) 212 of the data source(s) 202, the sensor data captured by the sensor(s) 218 of the TMC(s) 204, the traffic data from the traffic control engine 222, the sensor data captured by the sensor(s) 238 of the recipient device(s) 208, processed input data from the processor(s) 210, processed input data from the processor(s) 216, processed input data from the processor(s) 224, processed input data from the processor(s) 236, object detection data from the object tracking engine 228, object recognition data from the object tracking engine 228, and/or object tracking data from the object tracking engine 228. In some examples, the data fusion engine 230 may use the trained ML model(s) 232 of the server(s) 206 to consolidate and/or fuse together the different input datasets into the output dataset, for instance by providing the input datasets as inputs to the trained ML model(s) 232. The trained ML model(s) 232 used by the object tracking engine 228 can be trained (e.g., by the server(s) 206) using training data that includes the same types of data as described with respect to the input datasets, along with pre-consolidated or pre-fused combinations of these data (e.g., examples of what the output data should look like for those inputs in the training data). In some examples, the data fusion engine 230 can output a confidence level regarding the consolidation and/or fusion of the input data to form the output data. In some examples, the data fusion engine 230 discards portions of the output data if the confidence level falls below (and/or does not exceed) a predetermined confidence level threshold.

In some examples, the data fusion engine 230 can consolidate and/or fuse together sensor datasets from different sensors of the same sensor modality to generate the output data, for instance combining together depth data (e.g., merging point clouds together) and/or combining together images (e.g., stitching images together into a panorama). In some examples, the data fusion engine 230 can consolidate and/or fuse together sensor datasets from different sensors of different sensor modalities to generate the output data, for instance combining together image data with depth data to identify three-dimensional positioning information from the depth data that corresponds to respective pixels in the image data, and/or determining pixels of the image data that correspond to respective points or clusters (e.g., of points) or polygons (e.g., made from points) in the depth data.

The output data generated by the data fusion engine 230 can include an enhanced representation of the environment that may be customized, personalized, and/or tailored for the recipient device(s) 280. In some examples, the data fusion engine 230 can generate the enhanced representation of the environment by selecting a portion of the environment to focus the output data on, for instance by discarding data that does not fall within the selected portion of the environment. In some examples, the data fusion engine 230 can select the portion of the environment to focus the output data on based on object detection data from the object tracking engine 228, object recognition data from the object tracking engine 228, and/or object tracking data from the object tracking engine 228. In some examples, the data fusion engine 230 can select the portion of the environment to focus the output data on based on data received from the recipient device(s) 208. For instance, if a vehicle of the recipient device(s) 208 is being tracked, the server(s) 206 can identify the position of the vehicle based on positioning receiver data received from the recipient device(s) 208, can detect and/or recognize and/or track the vehicle within sensor data and/or traffic data using the object tracking engine 228, and can select the portion of the environment to focus the output data to include the vehicle, to include an area ahead of the vehicle that the vehicle will likely be in (e.g., based on the direction of the vehicle, the speed of the vehicles any planned movements of the vehicles so forth). The area ahead of the vehicle may include an area ahead of the vehicle in a direction that the vehicle is determined (e.g., by the object tracking engine 228) to be moving in. The size of the area ahead of the vehicle may be based on the speed that the vehicle is determined (e.g., by the object tracking engine 228) to be moving at, for instance with a higher speed corresponding to a larger size (e.g., since the vehicle will cross a larger distance during a given amount of time at higher speeds) and with a lower speed corresponding to a smaller size (e.g., since the vehicle will cross a smaller distance during a given amount of time at lower speeds). The area ahead of the vehicle may include an area that the vehicle is determined (e.g., by the object tracking engine 228) to be moving toward based on one or more planned movements of the vehicle (e.g., a direction that the vehicle plans to turn toward or change or merge lanes toward based on its turning indicator lights). Thus, the enhanced representation of the environment in the output data may be customized, personalized, and/or tailored for the recipient device(s) 280 by including an enhanced representation of a selected portion of the environment that is selected to be relevant to a specific one of the recipient device(s) 280 (e.g., the vehicle described above).

Figure 3:
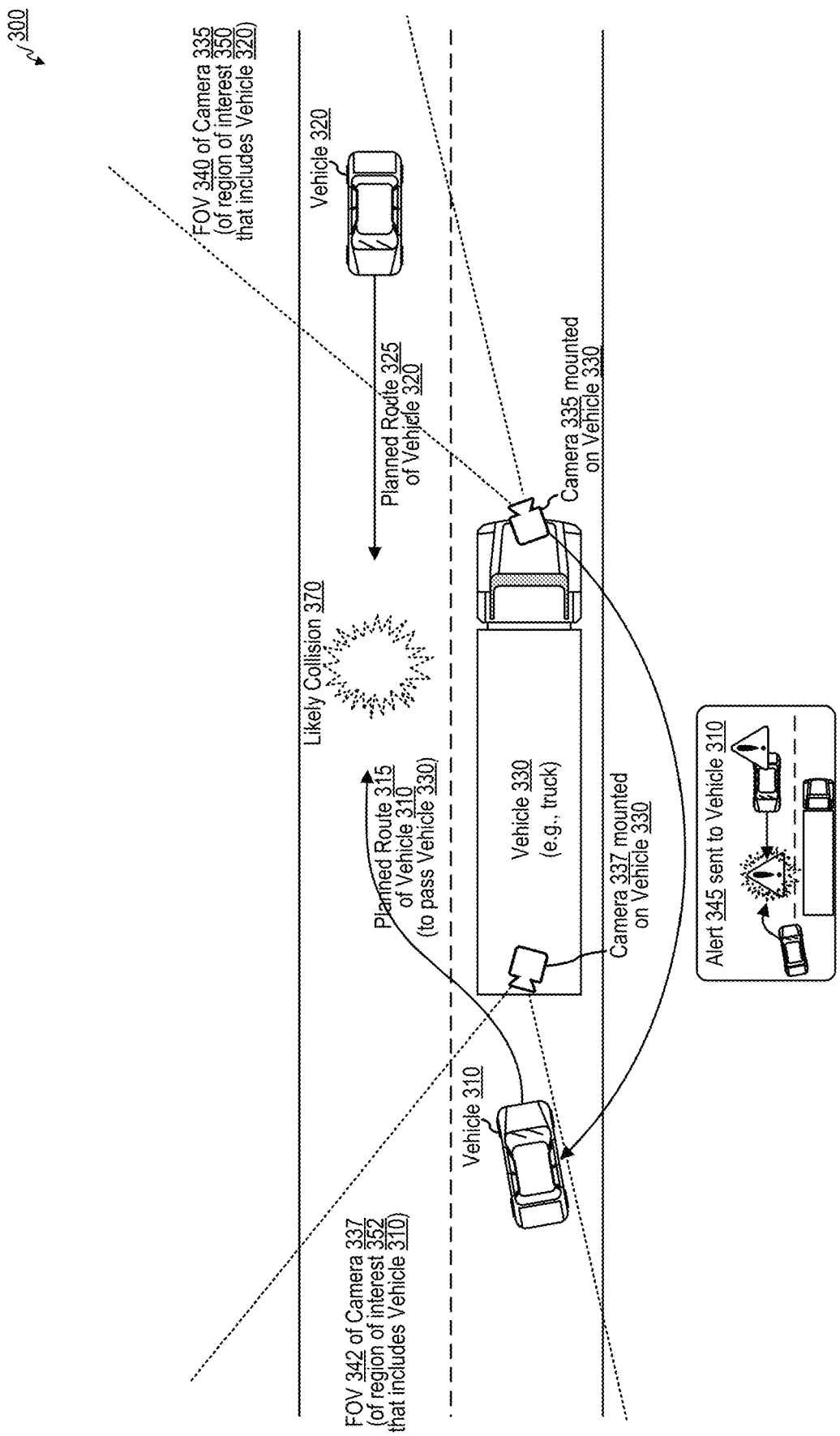
FIG. 3 is a top-down view diagram illustrating an example of collaborative enhanced sensing in a roadway environment with multiple vehicles, in accordance with some examples.

In some examples, the server(s) 206 may include an alert engine 244 that analyzes the object tracking data from the object tracking engine 228, the output data generated by the data fusion engine 230 (e.g., including the enhanced representation of the environment for the recipient device(s) 208), and/or any input data input to the server(s) 206 (e.g., from the data source(s) 202, the TMC(s) 204, and/or the recipient device(s) 208) to identify potential issues to alert the recipient device(s) 208 about. For instance, as depicted in FIG. 3, the alert engine 244 can analyze that planned movements of the vehicle 310 would result in an imminent collision with a vehicle 320 that is difficult (or even impossible) to sense (e.g., see or otherwise detect) from the perspective of the vehicle 310, and can generate an alert 345 to warn the vehicle 310. In some cases, the alert engine 244 can even modify the enhanced representation of the environment for the recipient device(s) 208, for instance to incorporate an alert similar to the alert 345 (or other indications of a collision or other issue, such as lines indicating paths of objects in the environment) into the enhanced representation of the environment for the recipient device(s) 208.

In some examples, the alert engine 244 may use the trained ML model(s) 232 for this analysis, and/or to generate this alert data. For instance, the alert engine 244 may provide the object tracking data from the object tracking engine 228, the output data generated by the data fusion engine 230 (e.g., including the enhanced representation of the environment for the recipient device(s) 208), and/or any input data input to the server(s) 206 (e.g., from the data source(s) 202, the TMC(s) 204, and/or the recipient device(s) 208) as inputs to the trained ML model(s) 232. The alert engine 244 may train the trained ML model(s) 232 for generating alert data by providing training data of these same types, along with indicators of issues (e.g., potential collisions, dangerous maneuvers, road hazards, other types of vehicular accidents) that are pre-identified from the remaining training data. In some examples, the alert engine 244 output a confidence level regarding the alert data and/or the analysis that identified the alert data. In some examples, the alert engine 244 discards portions of the alert data if the confidence level falls below (and/or does not exceed) a predetermined confidence level threshold. The alert engine 244, the data fusion engine 230, and/or the object tracking engine 228 can each have different predetermined confidence level thresholds, or in some cases can share predetermined confidence level thresholds. In some examples, the server(s) 206 may rank and/or assign different weights to output data based on the corresponding confidence levels. In some examples, confidence can be based on quality of input data, such as resolution of image data from image sensor(s), how blurry or sharp image data from image sensor(s) is, color range of image data from image sensor(s), and the like.

The server(s) 206 may use the transceiver(s) 226 to send the object tracking data generated by the object tracking engine 228 to the recipient device(s) 208, in some cases after the object tracking data is processed and/or combined (e.g., using the processor(s) 224) with output data generated by the data fusion engine 230 (e.g., including the enhanced representation of the environment for the recipient device(s) 208) and/or alert data generated by the alert engine 244. The server(s) 206 may use the transceiver(s) 226 to send the output data generated by the data fusion engine 230 (e.g., including the enhanced representation of the environment for the recipient device(s) 208) to the recipient device(s) 208, in some cases after the output data is processed and/or combined (e.g., using the processor(s) 224) with the object tracking data and/or alert data generated by the alert engine 244. The server(s) 206 may use the transceiver(s) 226 to send the alert data generated by the alert engine 244 to the recipient device(s) 208, in some cases after the alert data is processed and/or combined (e.g., using the processor(s) 224) with the object tracking data and/or the output data generated by the data fusion engine 230 (e.g., including the enhanced representation of the environment for the recipient device(s) 208). The transceiver(s) 226 may send the object tracking data from the object tracking engine 228 and/or the output data from the data fusion engine 230 (e.g., including the enhanced representation of the environment for the recipient device(s) 208) and/or the alert data generated by the alert engine 244 to the recipient device(s) 208 over a wired connection, a wireless connection, or a combination thereof. The transceiver(s) 226 may include components discussed with respect to the transceiver(s) 214, transceiver(s) 220, and/or transceiver(s) 240, and/or may function as discussed with respect to the transceiver(s) 214, transceiver(s) 220, and/or transceiver(s) 240.

The recipient device(s) 208 may receive data using the transceiver(s) 240, for instance from the server(s) 206. The data received by the transceiver(s) 240 of the recipient device(s) 208 may include, for instance, the object tracking data from the object tracking engine 228, the output data from the data fusion engine 230 (e.g., including the enhanced representation of the environment for the recipient device(s) 208), and/or the alert data generated by the alert engine 244. The recipient device(s) 208 include output device(s) 242 that can output the data that the recipient device(s) 208 receive using the transceiver(s) 240, for instance by displaying the data visibly (e.g., using a display), by playing the data audibly (e.g., using a speaker or headphones), by providing tactile feedback (e.g., using a tactile feedback actuator), or a combination thereof.

The output device(s) 242 can include one or more visual output devices, such as display(s) or connector(s) therefor. The output device(s) 242 can include one or more audio output devices, such as speaker(s), headphone(s), and/or connector(s) therefor. The output device(s) 242 can include one or more of the output device 1135 and/or of the communication interface 1140 of the computing system 1100. The recipient device(s) 208 cause the display(s) of the output device(s) 242 to display the object tracking data from the object tracking engine 228, the output data from the data fusion engine 230 (e.g., including the enhanced representation of the environment for the recipient device(s) 208), and/or the alert data generated by the alert engine 244.

In some examples, the display(s) of the output device(s) 242 of the recipient device(s) 208 function as optical "see-through" display(s) that allow light from the real-world environment (scene) around the output device(s) 242 to traverse (e.g., pass) through the display(s) of the output device(s) 242 to reach one or both eyes of the user. For example, the display(s) of the output device(s) 242 can be at least partially transparent, translucent, light-permissive, light-transmissive, or a combination thereof. In an illustrative example, the display(s) of the output device(s) 242 includes a transparent, translucent, and/or light-transmissive lens and a projector. The display(s) of the output device(s) 242 of can include a projector that projects virtual content onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display. The virtual content can include, for instance, object tracking data from the object tracking engine 228, the output data from the data fusion engine 230 (e.g., including the enhanced representation of the environment for the recipient device(s) 208), and/or the alert data generated by the alert engine 244.

In some examples, the display(s) of the output device(s) 242 of the recipient device(s) 208 are digital "pass-through" display that allow the user of the collaborative enhanced sensing system 200 to see a view of an environment by displaying the view of the environment on the display(s) of the output device(s) 242. The view of the environment that is displayed on the digital pass-through display can be a view of the real-world environment around the output device(s) 242, for example based on sensor data (e.g., images, videos, depth images, point clouds, other depth data, or combinations thereof) captured by one or more environment-facing sensors of the sensor(s) 238. The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content overlaid over other otherwise incorporated into the view of the environment. The virtual content can include, for instance, object tracking data from the object tracking engine 228, the output data from the data fusion engine 230 (e.g., including the enhanced representation of the environment for the recipient device(s) 208), and/or the alert data generated by the alert engine 244.

The trained ML model(s) 232 can include one or more neural network (NNs) (e.g., neural network 900), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, or combinations thereof.

In some examples, the collaborative enhanced sensing system 200 includes a feedback engine 234. The feedback engine 234 is illustrated as part of the server(s) 206, but may additionally or alternatively be part of the data source(s) 202, the TMC(s) 204, the recipient device(s) 208, or another device. The feedback engine 234 can detect feedback received from user interface(s) of any of the devices of the collaborative enhanced sensing system 200. The feedback may include feedback on the object tracking data from the object tracking engine 228, the output data from the data fusion engine 230 (e.g., including the enhanced representation of the environment for the recipient device(s) 208), and/or the alert data generated by the alert engine 244.

The feedback engine 234 can detect feedback about one engine of the collaborative enhanced sensing system 200 received from another engine of the collaborative enhanced sensing system 200, for instance whether one engine decides to use data from the other engine or not. For instance, the feedback engine 234 can detect whether the alert engine 244 decides to use data from the data fusion engine 230 and/or the object tracking engine 228, whether the data fusion engine 230 decides to use data from the object tracking engine 228, and so forth. The feedback received by the feedback engine 234 can be positive feedback or negative feedback. For instance, if the one engine of the collaborative enhanced sensing system 200 uses data from another engine of the collaborative enhanced sensing system 200, or if positive feedback from a user is received through a user interface, the feedback engine 234 can interpret this as positive feedback. If the one engine of the collaborative enhanced sensing system 200 declines to data from another engine of the collaborative enhanced sensing system 200, or if negative feedback from a user is received through a user interface, the feedback engine 234 can interpret this as negative feedback. Positive feedback can also be based on attributes of the sensor data from the sensor(s) 238 of the recipient device(s) 208, such as the user smiling, laughing, nodding, saying a positive statement (e.g., "yes," "confirmed," "okay," "next"), or otherwise positively reacting to the content. Negative feedback can also be based on attributes of the sensor data from the sensor(s) 238 of the recipient device(s) 208, such as the user frowning, crying, shaking their head (e.g., in a "no" motion), saying a negative statement (e.g., "no," "negative," "bad," "not this"), or otherwise negatively reacting to the content. In some examples, the feedback engine 234 can identify a reaction of the recipient device(s) 208 to the output data sent to the recipient device(s) 208 as positive feedback. For instance, if the recipient device(s) 208 include a vehicle, the feedback engine 234 can detect a reaction of the vehicle to the output data sent to the recipient device(s) 208 (e.g., a change to a current route and/or a planned route) as positive feedback.

In some examples, the feedback engine 234 provides the feedback to one or more ML systems of the collaborative enhanced sensing system 200 as training data to update the one or more trained ML model(s) 232 of the collaborative enhanced sensing system 200. For instance, the feedback engine 234 can provide the feedback as training data to the ML system(s) and/or the trained ML model(s) 232 to update the training for the object tracking engine 228, the data fusion engine 230, the alert engine 244, or a combination thereof. Positive feedback can be used to strengthen and/or reinforce weights associated with the outputs of the ML system(s) and/or the trained ML model(s) 232. Negative feedback can be used to weaken and/or remove weights associated with the outputs of the ML system(s) and/or the trained ML model(s) 232.

In some examples, certain elements of the collaborative enhanced sensing system 200 (e.g., the object tracking engine 228, the data fusion engine 230, the alert engine 244, the feedback engine 234, the trained ML model(s) 232, and/or the traffic control engine 222) include a software element, such as a set of instructions corresponding to a program, that is run on a processor such as the processor 1110 of the computing system 1100, the image processor 150, the host processor 152, the ISP 154, the processor(s) 210, the processor(s) 216, the processor(s) 224, the processor(s) 236, or a combination thereof. In some examples, these elements of the collaborative enhanced sensing system 200 include one or more hardware elements, such as a specialized processor (e.g., the processor 1110 of the computing system 1100, the image processor 150, the host processor 152, the ISP 154, the processor(s) 210, the processor(s) 216, the processor(s) 224, the processor(s) 236, or a combination thereof). In some examples, these elements of the collaborative enhanced sensing system 200 can include a combination of one or more software elements and one or more hardware elements.

In some examples, certain elements of the collaborative enhanced sensing system 200 (e.g., the object tracking engine 228, the data fusion engine 230, the alert engine 244, the feedback engine 234, the trained ML model(s) 232, and/or the traffic control engine 222) are run on different devices than those illustrated in FIG. 2. For instance, elements of the server(s) 206 (e.g., the object tracking engine 228, the data fusion engine 230, the alert engine 244, the feedback engine 234, and/or the trained ML model(s) 232) may additionally or alternatively be located on, and/or run on, the data source(s) 202, the TMC(s) 204, the recipient device(s) 208, or a combination thereof. For instance, in some examples, one of the recipient device(s) 208 can generate its own enhanced representation of the environment based on data that the one of the recipient device(s) 208 receives from the data source(s) 202 and/or the TMC 204 and/or the server(s) 206. In some examples, a first one of the recipient device(s) 208 can generate an enhanced representation of the environment for a second one of the recipient device(s) 208 based on data that the first one of the recipient device(s) 208 receives from the data source(s) 202 and/or the TMC 204 and/or the server(s) 206. In some examples, one of the data source(s) 202 can generate an enhanced representation of the environment for one of the recipient device(s) 208 based on its own data, and/or data it receives from other data source(s) 202 and/or the TMC 204 and/or the server(s) 206. In some examples, the TMC 204 can generate an enhanced representation of the environment for one of the recipient device(s) 208 based on its own data, and/or data it receives from the data source(s) 202 and/or the server(s) 206.

FIG. 3 is a top-down view diagram 300 illustrating an example of collaborative enhanced sensing in a roadway environment with multiple vehicles. The vehicles on the roadway environment of the top-down view diagram 300 of FIG. 3 includes a vehicle 310, a vehicle 320, and a vehicle 330. The vehicle 310 and the vehicle 330 are generally driving in a first direction, while the vehicle 320 is generally driving in a second direction that is parallel and opposite the first direction. The roadway environment includes two parallel one-way lanes with a dashed line between them, generally indicating that passing is permitted over the dashed line. The vehicle 330 includes a camera 335 coupled to (e.g., mounted on) the vehicle 330 that points toward a region of interest 350 of the environment that includes the vehicle 320, so that the field of view (FOV) 340 of the camera 335 includes the region of interest 350 of the environment that includes the vehicle 320. The vehicle 330 includes a camera 337 coupled to (e.g., mounted on) the vehicle 330 that points toward a region of interest 352 of the environment that includes the vehicle 310, so that the field of view (FOV) 342 of the camera 337 includes the region of interest 352 of the environment that includes the vehicle 310. The vehicle 330 may be an example of one of the data source(s) 202. The camera 335 and the camera 337 may be examples of sensor(s) 212 of the vehicle 330.

The vehicle 310 is behind the vehicle 330. A collaborative enhanced sensing system 200 (e.g., server(s) 206 and/or object tracking engine 228) may detect the vehicle 310, for instance based on a signal received from the vehicle 310 itself (e.g., via V2X communication) and/or based on detection of the vehicle 310 in the region of interest 352 (e.g., based on image data captured by the camera 337). The collaborative enhanced sensing system 200 (e.g., server(s) 206, object tracking engine 228, and/or alert engine 244) may determine that a planned route 315 of the vehicle 310 includes an attempt to pass the vehicle 330 by merging left into the other lane. The collaborative enhanced sensing system 200 may determine this based on a signal received from the vehicle 310 itself (e.g., via V2X communication) indicating or suggesting this planned route 315, based on detection of a blinking left indicator light of the vehicle 310 (e.g., based on image data captured by the camera 337), based on detection of a leftward movement by the vehicle 310 (e.g., based on image data captured by the camera 337), or a combination thereof.

The collaborative enhanced sensing system 200 (e.g., server(s) 206 and/or object tracking engine 228) may detect the vehicle 320, for instance based on a signal received from the vehicle 320 itself (e.g., via V2X communication) and/or based on detection of the vehicle 320 in the region of interest 350 (e.g., based on image data captured by the camera 335). The collaborative enhanced sensing system 200 (e.g., server(s) 206, object tracking engine 228, and/or alert engine 244) may determine that a planned route 325 of the vehicle 320 includes continuing forward in its lane. The collaborative enhanced sensing system 200 may determine this based on a signal received from the vehicle 310 itself (e.g., via V2X communication) indicating or suggesting this planned route 315, based on detection of the current route of the vehicle 320 (e.g., based on image data captured by the camera 335) and extrapolation of that path continuing, based on detection of a lack of obstacles or other vehicles for the vehicle 320 to want to pass in the region of interest 350 (e.g., based on image data captured by the camera 335), or a combination thereof.

The collaborative enhanced sensing system 200 (e.g., server(s) 206, object tracking engine 228, data fusion engine 230, and/or alert engine 244) may determine that the planned route 315 of the vehicle 310 and the planned route 325 of the vehicle 320 are likely to collide, even if the sensor data from the camera 335 and from the camera 337 do not cover all of the roadside environment, by extending the planned route 315 of the vehicle 310 and the planned route 325 of the vehicle 320 forward. A position of the likely collision 370 between the vehicle 310 and the vehicle 320, assuming the vehicle 310 follows the planned route 315 and the vehicle 320 follows the planned route 325, is illustrated in dashed lines. The collaborative enhanced sensing system 200 (e.g., server(s) 206, object tracking engine 228, data fusion engine 230, and/or alert engine 244) may generate an alert 345 and send the alert 345 to the vehicle 310. The alert 345 may indicate, for instance, that the planned route 315 is likely to result in the likely collision 370. The alert 345 may represent an enhanced representation of the environment, since the alert 345 notifies the vehicle 310 of something (the vehicle 320, its planned route 325, and the resulting likely collision 370) that would be difficult (or impossible) to detect from the perspective of the vehicle 310 due to the presence of the vehicle 330 blocking the vehicle 310's view of the vehicle 320. The alert 345 may indicate a risk of a collision, such as the likely collision 370. Because the vehicle 310 is receiving the alert 345, the vehicle 310 may be an example of the recipient device(s) 208.

The alert 345 is illustrated in FIG. 3 as including a visual representation of the vehicle 320, the vehicle 310, the vehicle 330, the planned route 315, the planned route 325, and the likely collision 370. The visual representation may be generated using the data fusion engine 230 and/or the alert engine 244, and may be included as part of the alert 345 (e.g., as part of the enhanced representation of the environment provided to the vehicle 310). The vehicle 310 may include output device(s) 242, such as display(s), that may display the alert 345, play associated sounds (e.g., a warning siren), actuate tactile feedback actuator(s) to provide tactile feedback (e.g., in the steering wheel to the driver of the vehicle 310), or a combination thereof.

In some examples, portion(s) of the collaborative enhanced sensing system 200 (e.g., server(s) 206, object tracking engine 228, data fusion engine 230, and/or alert engine 244) may be housed in the vehicle 330, the vehicle 310, the vehicle 320, and/or other devices not pictured in FIG. 3 (e.g., remote server(s)). For instance, in an illustrative example, the vehicle 330 may function both as one of the data source(s) 202 and as one of the server(s) 206, in which case the vehicle 330 may generate the alert 345 for the vehicle and send the alert 345 to the vehicle 310.

Figure 4:
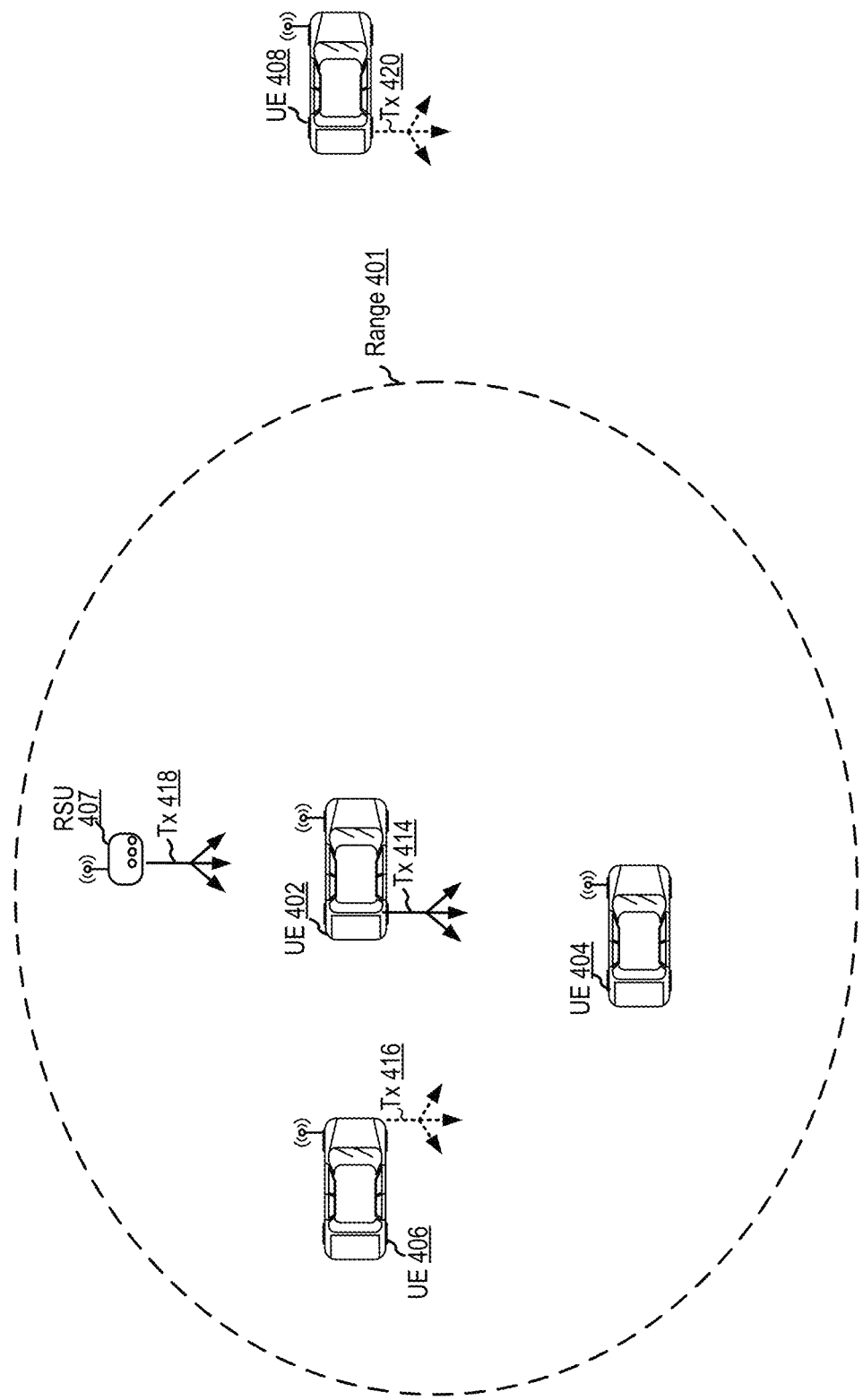
FIG. 4 is a top-down view diagram illustrating an example of devices involved in wireless communications, in accordance with some examples.

FIG. 4 is a top-down view diagram 400 illustrating an example of devices involved in wireless communications. The wireless communications can include, for example, sidelink communications, V2X communications, or other device-to-device (D2D) communications. The communication may be based on a sidelink slot structure. For example, transmitting UE 402 may transmit a transmission 414, e.g., comprising a control channel and/or a corresponding data channel, that may be received by receiving UEs 404, 406, 408, using respective receivers thereof (e.g., illustrated as antennae of the UEs 404, 406, 408 in FIG. 4). At least one UE may comprise an autonomous vehicle, an unmanned aerial vehicle, or another type of vehicle. A control channel may include information for decoding a data channel and may also be used by receiving device to avoid interference by refraining from transmitting on the occupied resources during a data transmission. The number of transmission time interfals (TTIs), as well as the resource blocks (RBs) that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 (and 418 by RSU 407) may be broadcast or multicast to nearby devices. For example, UE 414 may transmit communication intended for receipt by other UEs within a range 401 of UE 414. Additionally and/or alternatively, RSU 407 may receive transmission(s) from and/or transmit transmission(s) 418 to UEs 402, 404, 406, 408. UE 402, 404, 406, 408 or RSU 407 may comprise a detection component (e.g., for error detection and/or correction, as in hybrid automatic repeat request (HARM)). In some examples, UE 402, 404, 406, 408 and/or RSU 407 may also receive a basic safety message (BSM). In some examples, UE 402, 404, 406, 408 and/or RSU 407 may also include a mitigation component.

In some examples, the UE 402, the UE 404, the UE 406, the UE 408, and/or the RSU 407 may be examples of the data source(s) 202. For instance, the transmissions 414, the transmissions 416, the transmissions 418, and/or the transmissions 420 may include sensor data captured by sensor(s) 212 of the UE 402, the UE 404, the UE 406, the UE 408, and/or the RSU 407. In some examples, the RSU 407 may be an example of the TMC(s) 204. For instance, the transmissions 418 may include sensor data captured by sensor(s) 218 of the RSU 407 and/or traffic data from a traffic control engine 222 of the RSU 407. In some examples, the UE 402, the UE 404, the UE 406, the UE 408, and/or the RSU 407 may be examples of the server(s) 206. For instance, the transmissions 414, the transmissions 416, the transmissions 418, and/or the transmissions 420 may include object tracking data from the object tracking engine 228, the output data from the data fusion engine 230 (e.g., including the enhanced representation of the environment for the recipient device(s) 208), and/or the alert data generated by the alert engine 244. In some examples, the UE 402, the UE 404, the UE 406, the UE 408, and/or the RSU 407 may be examples of the recipient device(s) 208, and may thus receive transmissions (e.g., the transmissions 414, the transmissions 416, the transmissions 418, and/or the transmissions 420) to be output using the output device(s) 242.

Figure 5A:
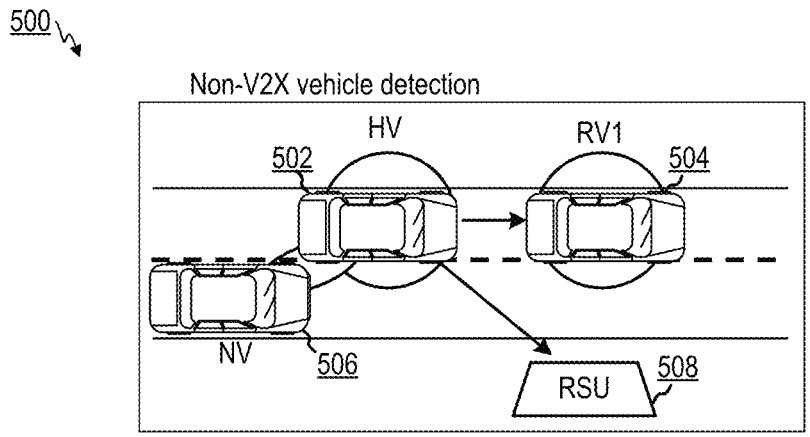
FIG. 5A is a top-down view diagram illustrating an example of sensor-sharing for cooperative and automated driving systems based on detection of a non-vehicle-to-everything (non-V2X) vehicle, in accordance with some examples.

FIG. 5A is a top-down view diagram 500 illustrating an example of sensor-sharing for cooperative and automated driving systems based on detection of a non-vehicle-to-everything (non-V2X) vehicle. In wireless communications, such as V2X communications, V2X entities may perform sensor sharing with other V2X entities for cooperative and automated driving. For example, with reference to top-down view diagram 500 of FIG. 5A, the host vehicle (HV) 502 may detect a number of items within its environment. For example, the HV 502 may detect the presence of the non-V2X entity (NV) 506 at block 532. The HV 502 may inform other entities, such as a first remote vehicle (RV1) 504 or a road side unit (RSU) 508, about the presence of the NV 506, if the RV1 504 and/or the RSU 508, by themselves, are unable to detect the NV 506. The HV 502 informing the RV1 504 and/or the RSU 508 about the NV 506 is a sharing of sensor information.

Figure 5B:
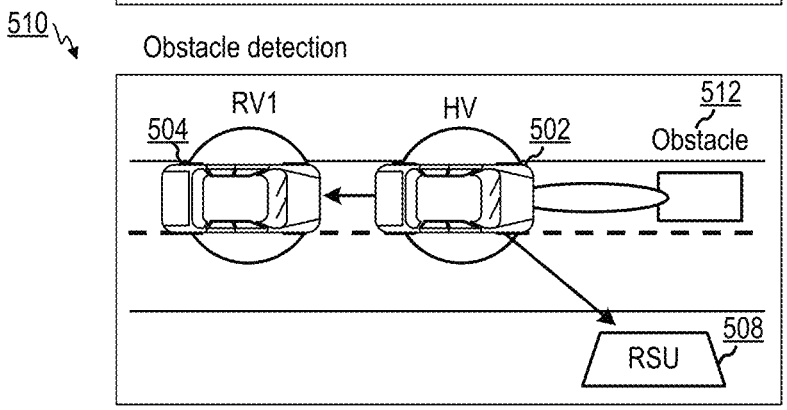
FIG. 5B is a top-down view diagram illustrating an example of sensor-sharing for cooperative and automated driving systems based on obstacle detection, in accordance with some examples.

FIG. 5B is a top-down view diagram 510 illustrating an example of sensor-sharing for cooperative and automated driving systems based on obstacle detection. With reference to top-down view diagram 510 of FIG. 5B, the HV 502 may detect a physical obstacle 512, such as a pothole, debris, or an object that may be an obstruction in the path of the HV 502 and/or RV1 504 that has not yet been detected by RV1 504 and/or RSU 508. The HV 502 may inform the RV1 and/or the RSU 508 of the obstacle 512, such that the obstacle 512 may be avoided.

Figure 5C:
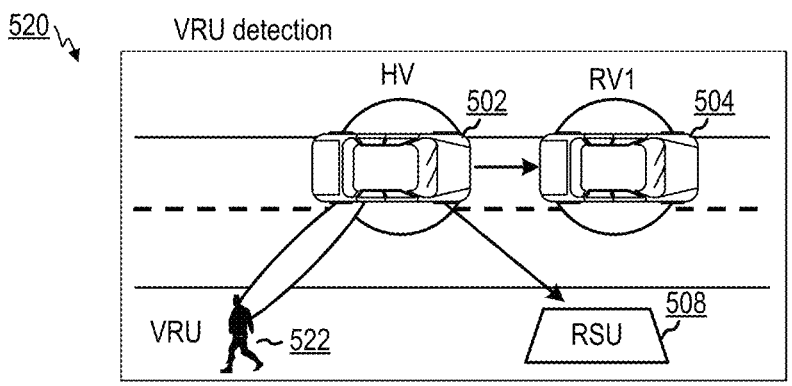
FIG. 5C is a top-down view diagram illustrating an example of sensor-sharing for cooperative and automated driving systems based on vulnerable road user (VRU) detection, in accordance with some examples.

FIG. 5C is a top-down view diagram 520 illustrating an example of sensor-sharing for cooperative and automated driving systems based on vulnerable road user (VRU) detection. With reference to top-down view diagram 520 of FIG. 5C, the HV 502 may detect the presence of a vulnerable road user (VRU) 522 and may share the detection of the VRU 522 with the RV1 504 and the RSU 508, in instances where the RSU 508 and/or RV1 504 may not be able to detect the VRU 522.

Figure 5D:
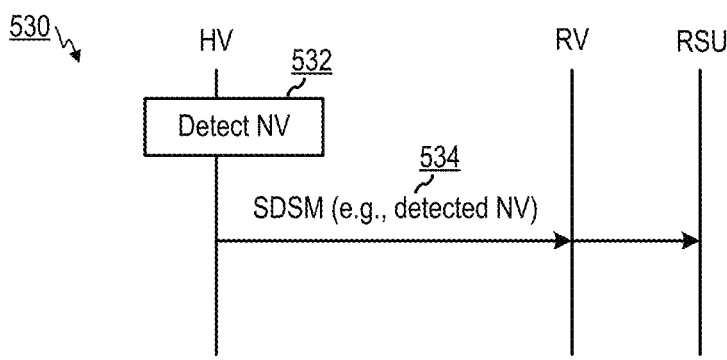
FIG. 5D is a swim lane diagram illustrating an example of sensor-sharing for cooperative and automated driving systems based on transmission of a sensor data sharing message (SDSM), in accordance with some examples.

FIG. 5D is a swim lane diagram 530 illustrating an example of sensor-sharing for cooperative and automated driving systems based on transmission of a sensor data sharing message (SDSM) 534. With reference to swim lane diagram 530 of FIG. 5D, the HV, upon detection of a nearby entity (e.g., NV, VRU, obstacle) may transmit a sensor data sharing message (SDSM) 534 to the RV and/or the RSU to share the detection of the entity. The SDSM 534 may be a broadcast message such that any receiving device within the vicinity of the HV may receive the message. In some instances, the shared information may be relayed to other entities, such as RVs.

In some examples, the HV 502, the RV1 504, the NV 506, the RSU 508, the obstacle 512, and/or the VRU 522 may be examples of the data source(s) 202. For instance, the SDSM 534 may include sensor data captured by sensor(s) 212 of the HV 502, the RV1 504, the NV 506, the RSU 508, the obstacle 512, and/or the VRU 522. In some examples, the RSU 508 may be an example of the TMC(s) 204. For instance, the SDSM 534 may include sensor data captured by sensor(s) 218 of the RSU 508 and/or traffic data from a traffic control engine 222 of the RSU 508. In some examples, the HV 502, the RV1 504, the NV 506, the RSU 508, the obstacle 512, and/or the VRU 522 may be examples of the server(s) 206. For instance, the SDSM 534 may include object tracking data from the object tracking engine 228, the output data from the data fusion engine 230 (e.g., including the enhanced representation of the environment for the recipient device(s) 208), and/or the alert data generated by the alert engine 244. In some examples, the RV1 504 and/or the RSU 508 may be examples of the recipient device(s) 208, and may thus receive transmissions (e.g., the SDSM 534) that may be output using output device(s) 242 of the RV1 504 and/or the RSU 508.

Figure 6:
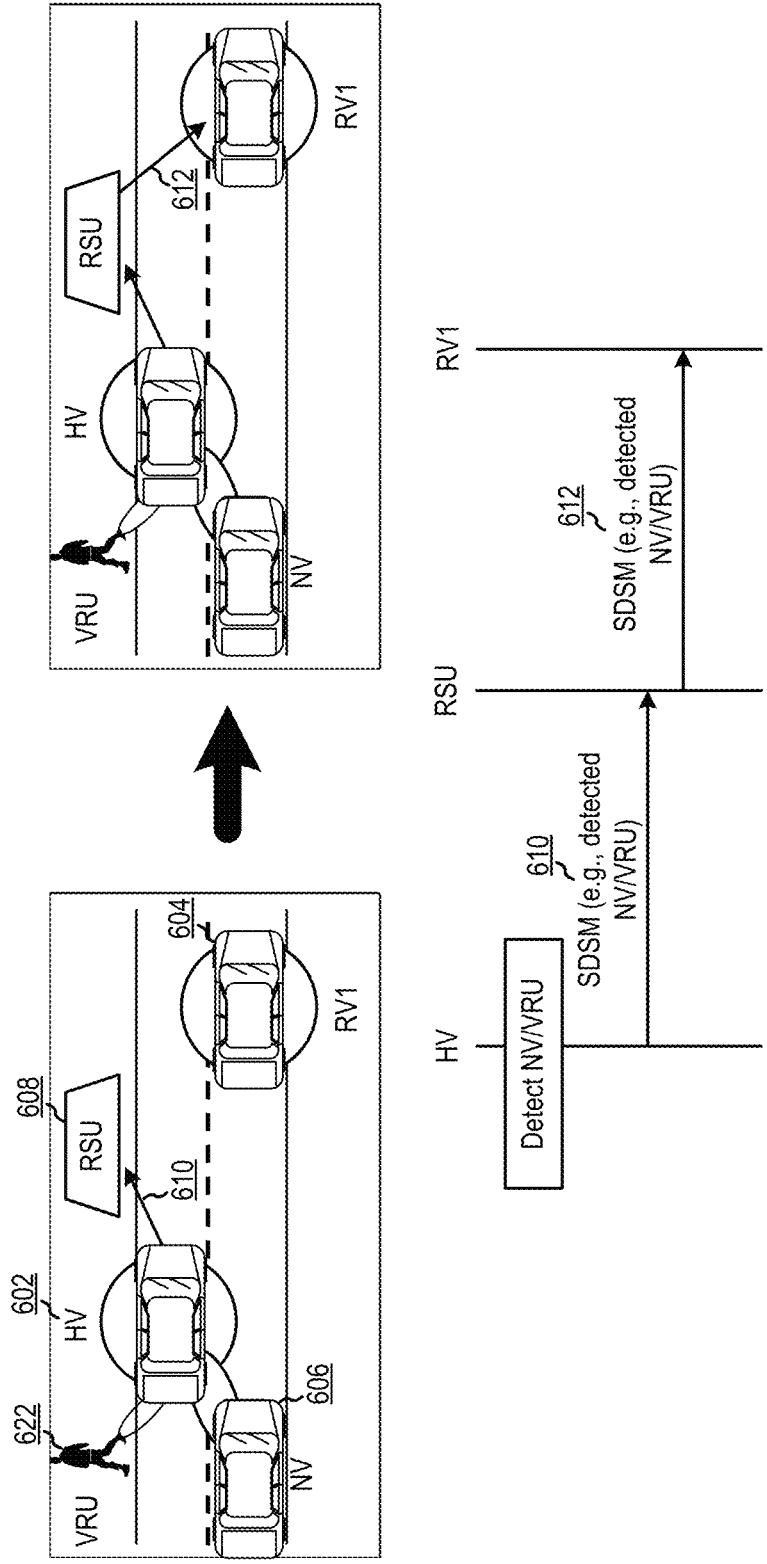
FIG. 6 is a conceptual diagram illustrating an example of sensor-sharing for cooperative and automated driving systems, in accordance with some examples.

FIG. 6 is a conceptual diagram 600 illustrating an example of sensor-sharing for cooperative and automated driving systems. With reference to conceptual diagram 600 of FIG. 6, the HV 602 may detect the presence of the NV 606 and/or the VRU 622. The HV 602 may broadcast the SDSM 610 to the RSU 608 to report the detection of NV 606 and/or VRU 622. The RSU 608 may relay the SDSM 610 received from the HV 602 to remote vehicles such that the remote vehicles are aware of the presence of the NV 606 and/or VRU 622. For example, the RSU 608 may transmit an SDSM 612 to the RV1 604, where the SDSM 612 includes information related to the detection of NV 606 and/or VRU 622.

In some examples, the HV 602, the RV1 604, the NV 605, the RSU 608, and/or the VRU 622 may be examples of the data source(s) 202. For instance, the SDSM 610 and/or the SDSM 612 may include sensor data captured by sensor(s) 212 of the HV 602, the RV1 604, the NV 605, the RSU 608, and/or the VRU 622. As indicated by the detections (e.g., of NVs, RVs, obstacles, and/or VRUs) illustrated and discussed with respect to FIGS. 5A-5D and FIG. 6—in some cases, an object tracking engine 228, or portion(s) thereof, may be located in the data source(s) 202. In some examples, the RSU 608 may be an example of the TMC(s) 204. For instance, the SDSM 610 and/or the SDSM 612 may include sensor data captured by sensor(s) 218 of the RSU 608 and/or traffic data from a traffic control engine 222 of the RSU 608. In some examples, the HV 602, the RV1 604, the NV 605, the RSU 608, and/or the VRU 622 may be examples of the server(s) 206. For instance, the SDSM 610 and/or the SDSM 612 may include object tracking data from the object tracking engine 228, the output data from the data fusion engine 230 (e.g., including the enhanced representation of the environment for the recipient device(s) 208), and/or the alert data generated by the alert engine 244. In some examples, the RV1 604 and/or the RSU 608 may be examples of the recipient device(s) 208, and may thus receive transmissions (e.g., the SDSM 610 and/or the SDSM 612) that may be output using output device(s) 242 of the RV1 604 and/or the RSU 608.

Figure 7:
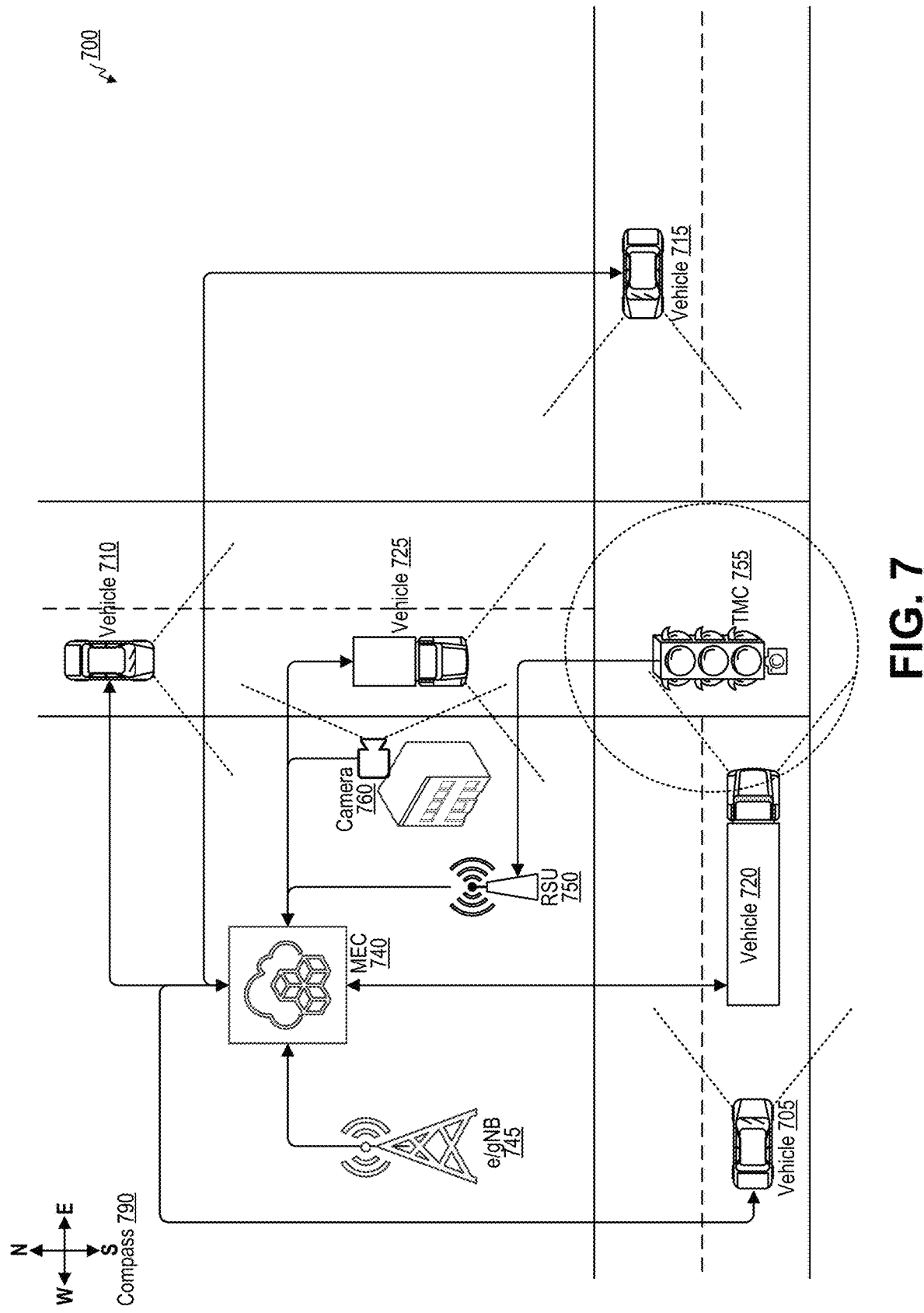
FIG. 7 is a top-down view diagram illustrating an example of collaborative enhanced sensing in a roadway environment with multiple vehicles, in accordance with some examples.

FIG. 7 is a top-down view diagram 700 illustrating an example of collaborative enhanced sensing in a roadway environment with multiple vehicles. A compass 790 provides directional orientation in the roadway environment of FIG. 7. An MEC 740 is illustrated as part of the roadway environment of FIG. 7. The MEC 740 may be an example of the server(s) 206.

The roadway environment of FIG. 7 also includes an eNodeB or gNodeB 745, an RSU 750, a camera 760 on a building, and a TMC 755. The RSU 750 and the camera 760 can represent examples the data source(s) 202, and/or the sensor(s) 212 thereof. The RSU 750 and the camera 760 are illustrated, using an arrow, as sending data (e.g., sensor data) to the MEC 740. Dashed lines extending from the camera 760 represent a field of view of the sensor(s) 212 (e.g., image sensor(s)) of the camera 760.

The vehicles in the roadway environment of FIG. 7 include a vehicle 705 heading east toward an intersection, a vehicle 710 heading south toward the same intersection, a vehicle 715 heading west toward the same intersection, a vehicle 720 (a truck) heading east toward the same intersection, and a vehicle 725 (a truck) heading south toward the same intersection. Each of these vehicles (vehicle 705, vehicle 710, vehicle 715, vehicle 720, and/or vehicle 725) can be an example of one of the data source(s) 202 and/or one of the recipient device(s) 208, as indicated by the double-sided arrows connecting each of the vehicles to the MEC 740. Dashed lines extending diagonally from the respective front of each of the vehicles respectively represent a field of view of the sensor(s) 212 (e.g., image sensor(s) and/or depth sensor(s)) of each of the vehicles.

A TMC 755 is illustrated at the intersection. The TMC 755 is an example of the TMC(s) 204, and includes a traffic light (e.g., part of the traffic control engine 222 of the TMC 755) and a camera (e.g., one of the sensor(s) 218 of the TMC 755). A dashed circle around the TMC 755 represents a field of view of the camera of the TMC 755. The RSU 750 and the TMC 755 are communicatively coupled, with the TMC 755 sending data to the RSU 750 and/or to the MEC 740 through the RSU 750. The RSU 750 and/or the TMC 755 can be examples of the TMC(s) 204, and can send data (e.g., sensor data and/or traffic data) to the MEC 740. The eNodeB or gNodeB 745 can be used to convey data between the nodes (e.g., the vehicles, the RSU 750, the TMC 755, and/or the camera 760) and the MEC 740. The eNodeB or gNodeB 745 can represent part of the server(s) 206, the data source(s) 202 (e.g., as part of a positioning system based on cellular signal), the recipient device(s) 208 (e.g., to convey information on to other recipient device(s) 208), or a combination thereof.

Figure 8:
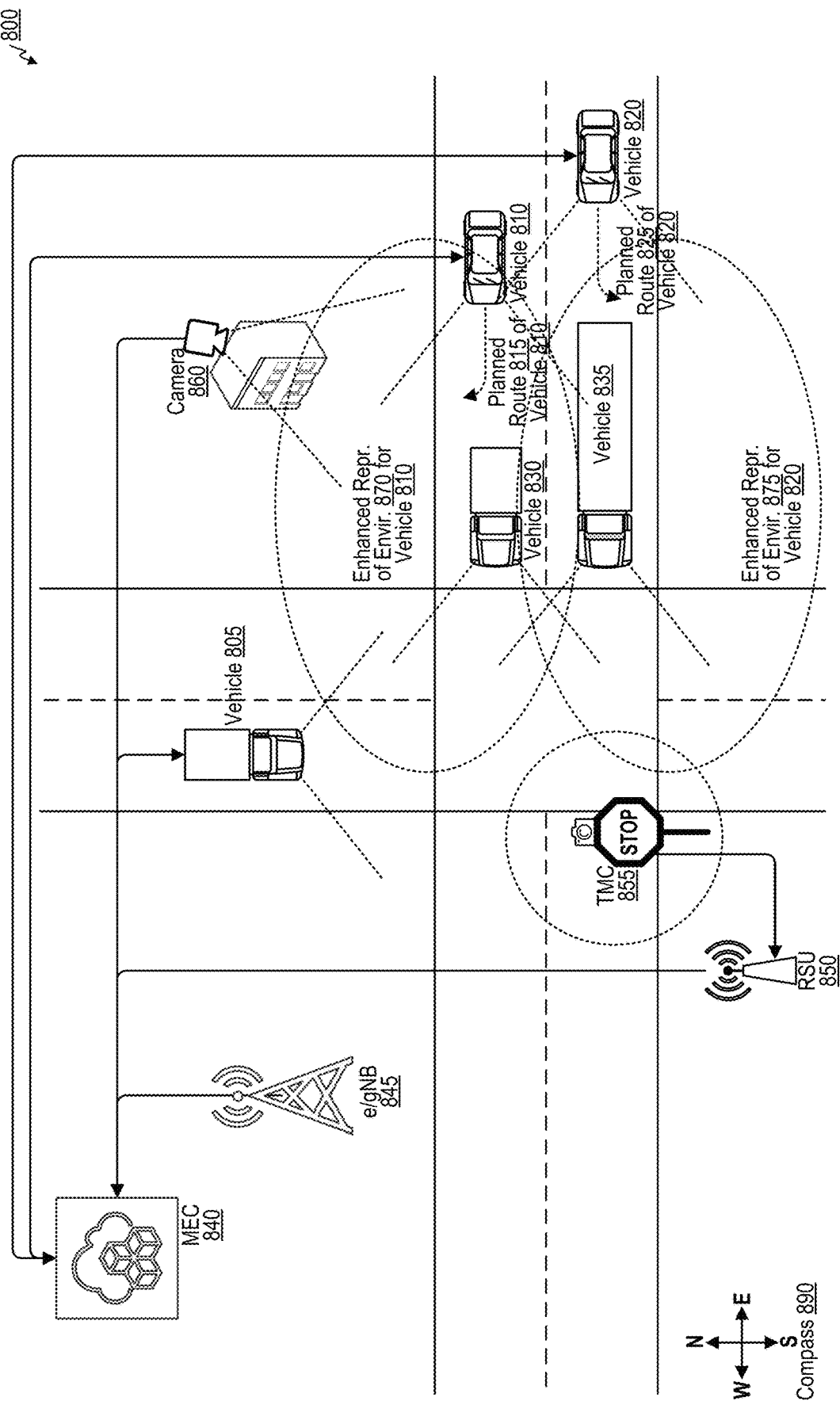
FIG. 8 is a top-down view diagram illustrating an example of collaborative enhanced sensing in a roadway environment that provides different enhanced views to different vehicles, in accordance with some examples.

FIG. 8 is a top-down view diagram 800 illustrating an example of collaborative enhanced sensing in a roadway environment that provides different enhanced views to different vehicles. A compass 890 provides directional orientation in the roadway environment of FIG. 8. An MEC 840 is illustrated as part of the roadway environment of FIG. 8. The MEC 840 may be an example of the server(s) 206. The roadway environment of FIG. 8 also includes an eNodeB or gNodeB 845, an RSU 850, a camera 860 on a building, and a TMC 855. The RSU 850 and the camera 860 can represent examples the data source(s) 202, and/or the sensor(s) 212 thereof. The RSU 850 and the camera 860 are illustrated, using an arrow, as sending data (e.g., sensor data) to the MEC 840. Dashed lines extending from the camera 860 represent a field of view of the sensor(s) 212 (e.g., image sensor(s)) of the camera 860.

The vehicles in the roadway environment of FIG. 8 include a vehicle 805 heading south toward an intersection, a vehicle 810 heading west toward the same intersection, a vehicle 820 heading west toward the same intersection, a vehicle 830 (a truck) heading west toward the same intersection, and a vehicle 835 (a truck) heading west toward the same intersection. Each of these vehicles (vehicle 805, vehicle 810, vehicle 820, vehicle 830, and/or vehicle 835) can be an example of one of the data source(s) 202 and/or one of the recipient device(s) 208, as indicated by the double-sided arrows connecting each of the vehicles to the MEC 840. Dashed lines extending diagonally from the respective front of each of the vehicles respectively represent a field of view of the sensor(s) 212 (e.g., image sensor(s) and/or depth sensor(s)) of each of the vehicles.

A dashed arrow extending from the vehicle 810 represents a planned route 815 of the vehicle 810. The planned route 815 of the vehicle 810 indicates that the vehicle 810 is planning to turn right at the intersection. A dashed arrow extending from the vehicle 820 represents a planned route 825 of the vehicle 820. The planned route 825 of the vehicle 820 indicates that the vehicle 820 is planning to turn left at the intersection. The MEC 840 can determine these planned movements based on communications from the vehicle 310 and/or the vehicle 320 (e.g., V2X communications), based on detection of indicator signals such as turn signals in use by the the vehicle 310 and/or the vehicle 320 (e.g., from the view of the camera 860 and/or other cameras), or a combination thereof.

In response to determining the planned movements (e.g., the planned route 815 of the vehicle 810 and/or the planned route 825 of the vehicle 820), MEC 840 generates an enhanced representation of the environment 870 for the vehicle 810, and sends the enhanced representation of the environment 870 for the vehicle 810 to the vehicle 810. The MEC 840 generates an enhanced representation of the environment 875 for the vehicle 820, and sends the enhanced representation of the environment 875 for the vehicle 820 to the vehicle 820. Because the vehicle 810 and the vehicle 820 are similarly positioned and both traveling in the same direction (west) along the same road toward the same intersection, the enhanced representation of the environment 870 for the vehicle 810 and the enhanced representation of the environment 875 for the vehicle 820 are similar, and each include representations of respective areas of the environment (including the road) ahead of the respective vehicles in the direction (west), including at least part of the intersection. However, because the planned movements of the vehicle 810 and the vehicle 820 are different—the vehicle 810 is planning to turn right (north) while the vehicle 820 is planning to turn left (south)—the enhanced representation of the environment 870 for the vehicle 810 and the enhanced representation of the environment 875 for the vehicle 820 are distinct. For instance, the enhanced representation of the environment 870 for the vehicle 810 includes an area of the environment that is further north (the direction the vehicle 310 is turning toward), and includes a portion of the street to the north of the intersection, while the enhanced representation of the environment 875 for the vehicle 820 includes an area of the environment that is further south (the direction the vehicle 320 is turning toward), and includes a portion of the street to the south of the intersection.

A TMC 855 is illustrated at the intersection. The TMC 855 is an example of the TMC(s) 204, and includes a stop sign (e.g., part of the traffic control engine 222 of the TMC 855) and a camera (e.g., one of the sensor(s) 218 of the TMC 855). A dashed circle around the TMC 855 represents a field of view of the camera of the TMC 855. The field of view of the camera of the TMC 855 overlaps with the enhanced representation of the environment 875 for the vehicle 820, and thus sensor data from the camera of the TMC 855 may be used to generate the enhanced representation of the environment 875 for the vehicle 820. The RSU 850 and the TMC 855 are communicatively coupled, with the TMC 855 sending data to the RSU 850 and/or to the MEC 840 through the RSU 850. The RSU 850 and/or the TMC 855 can be examples of the TMC(s) 204, and can send data (e.g., sensor data and/or traffic data) to the MEC 840. The eNodeB or gNodeB 845 can be used to convey data between the nodes (e.g., the vehicles, the RSU 850, the TMC 855, and/or the camera 860) and the MEC 840. The eNodeB or gNodeB 845 can represent part of the server(s) 206, the data source(s) 202 (e.g., as part of a positioning system based on cellular signal), the recipient device(s) 208 (e.g., to convey information on to other recipient device(s) 208), or a combination thereof.

Figure 9:
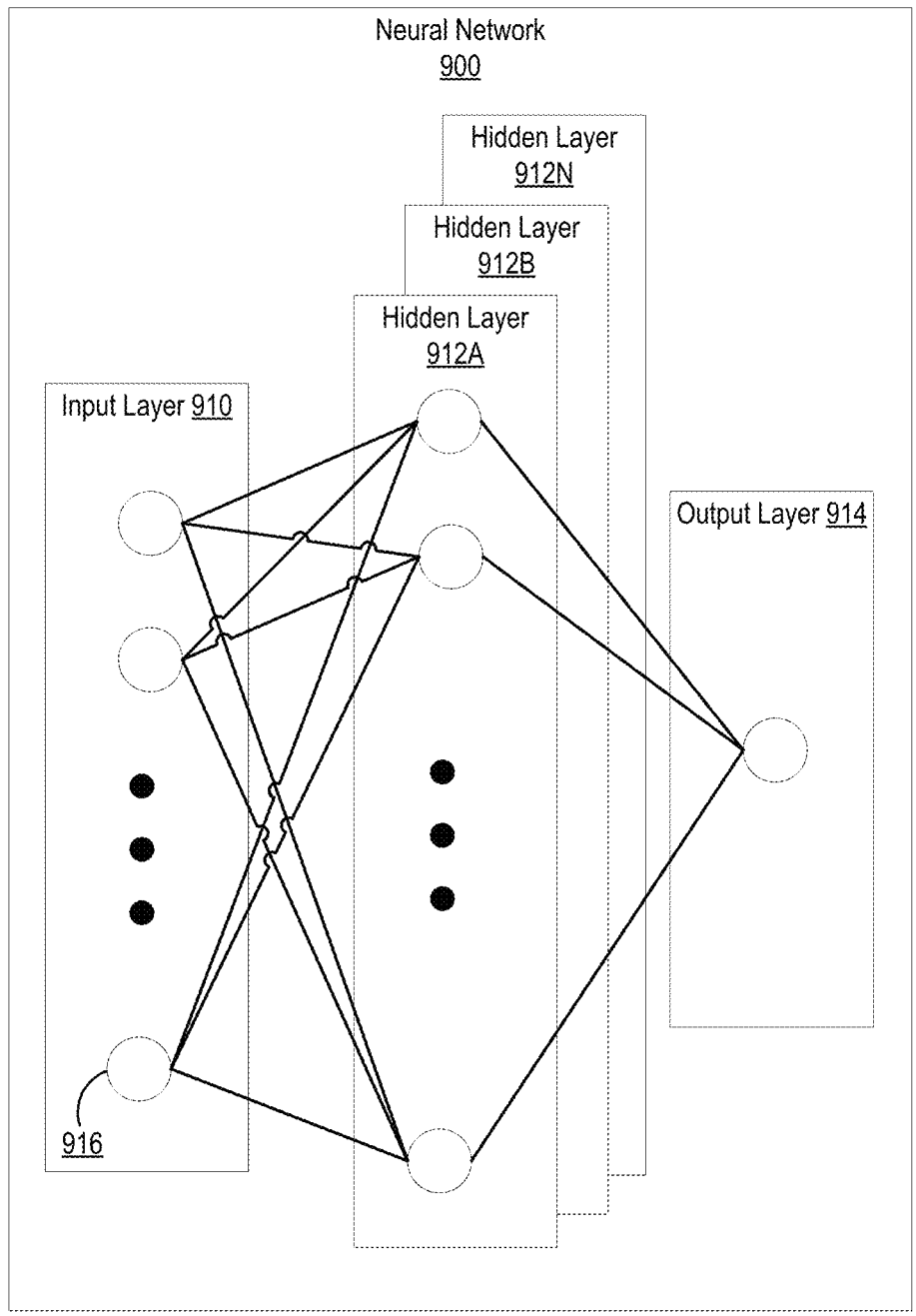
FIG. 9 is a block diagram illustrating an example of a neural network that can be used for collaborative enhanced sensing operations, in accordance with some examples.

FIG. 9 is a block diagram illustrating an example of a neural network (NN) 900 that can be used for collaborative enhanced sensing operations. The neural network 900 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 900 may be an example of one of the one or more trained machine learning models 232 of the collaborative enhanced sensing system 200, which may be used by the object tracking engine 228, the data fusion engine 230, the alert engine 244, or a combination thereof.

An input layer 910 of the neural network 900 includes input data. The input data of the input layer 910 can include data representing the pixels of one or more input image frames. In some examples, the input data of the input layer 910 includes data representing the pixels of image data captured by one or more image sensor(s). Examples of image sensors include the sensor(s) 212, sensor(s) 218, sensor(s) 238, image sensor(s) of camera 335, image sensor(s) of camera 337, image sensor(s) of any of the UE(s) of FIG. 4, image sensor(s) of the RSU 407, image sensor(s) of the HV 502, image sensor(s) of the RSU 508, image sensor(s) of the HV 502, image sensor(s) of the RSU 508, image sensor(s) of the HV 602, image sensor(s) of the RSU 608, image sensor(s) of the camera 760, image sensor(s) of the TMC 755, image sensor(s) of the RSU 750, image sensor(s) of the eNodeB or gNodeB 745, image sensor(s) of any of the vehicles of FIG. 7, image sensor(s) of the camera 860, image sensor(s) of the TMC 855, image sensor(s) of the RSU 850, image sensor(s) of the eNodeB or gNodeB 845, image sensor(s) of any of the vehicles of FIG. 8, image sensor(s) that capture at least a portion of the sensor data of operation 1005, input devices 1145, or a combination thereof. In some examples, the input data of the input layer 910 includes depth data captured by depth sensors, and/or other sensor data captured by other sensor types described herein. Any of the examples of image sensors listed above can additionally or alternatively include depth sensors and/or other sensor types described herein. In some examples, the input data of the input layer 910 includes metadata associated with sensor data. In some examples, the input data of the input layer 910 additionally or alternatively includes traffic data (e.g., from traffic control engine 222 of the TMC(s) 204), object tracking data from the object tracking engine 228, the output data from the data fusion engine 230 (e.g., including the enhanced representation of the environment for the recipient device(s) 208), or a combination thereof. The input data may include input data (e.g., sensor data) sent using an SDSM, such as the SDSM 534, the SDSM 610, and/or the SDSM 612.

The images can include image data from an image sensor including raw pixel data (including a single color per pixel based, for example, on a Bayer filter) or processed pixel values (e.g., RGB pixels of an RGB image). The neural network 900 includes multiple hidden layers 912A, 912B, through 912N. The hidden layers 912A, 912B, through 912N include "N" number of hidden layers, where "N" is an integer greater than or equal to one. The number of hidden layers can be made to include as many layers as needed for the given application. The neural network 900 further includes an output layer 914 that provides an output resulting from the processing performed by the hidden layers 912A, 912B, through 912N.

In some examples, the output layer 914 can provide output data. Examples of the output data include object tracking data from the object tracking engine 228, the output data from the data fusion engine 230 (e.g., including the enhanced representation of the environment for the recipient device(s) 208), the alert data generated by the alert engine 244 (e.g., alert 345), output data sent by the MEC 740, output data sent by the MEC 840, the enhanced representation of the environment 870 for the vehicle 810, the enhanced representation of the environment 875 for the vehicle 820, the enhanced representation of the environment of operation 1015, or a combination thereof. The output data may include output data sent using an SDSM, such as the SDSM 534, the SDSM 610, and/or the SDSM 612.

The neural network 900 is a multi-layer neural network of interconnected filters. Each filter can be trained to learn a feature representative of the input data. Information associated with the filters is shared among the different layers and each layer retains information as information is processed. In some cases, the neural network 900 can include a feed-forward network, in which case there are no feedback connections where outputs of the network are fed back into itself. In some cases, the network 900 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 910 can activate a set of nodes in the first hidden layer 912A. For example, as shown, each of the input nodes of the input layer 910 can be connected to each of the nodes of the first hidden layer 912A. The nodes of a hidden layer can transform the information of each input node by applying activation functions (e.g., filters) to this information. The information derived from the transformation can then be passed to and can activate the nodes of the next hidden layer 912B, which can perform their own designated functions. Example functions include convolutional functions, downscaling, upscaling, data transformation, and/or any other suitable functions. The output of the hidden layer 912B can then activate nodes of the next hidden layer, and so on. The output of the last hidden layer 912N can activate one or more nodes of the output layer 914, which provides a processed output image. In some cases, while nodes (e.g., node 916) in the neural network 900 are shown as having multiple output lines, a node has a single output and all lines shown as being output from a node represent the same output value.

In some cases, each node or interconnection between nodes can have a weight that is a set of parameters derived from the training of the neural network 900. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 910 using the different hidden layers 912A, 912B, through 912N in order to provide the output through the output layer 914.

Figure 10:
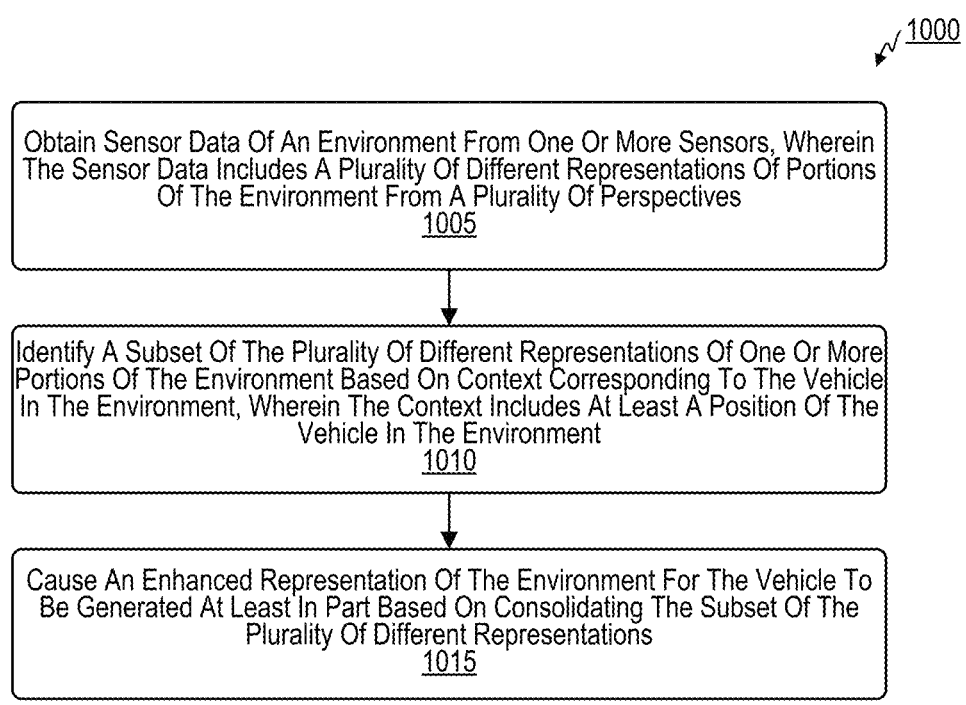
FIG. 10 is a flow diagram illustrating a collaborative enhanced sensing process, in accordance with some examples.

FIG. 10 is a flow diagram illustrating a collaborative enhanced sensing process 1000. The collaborative enhanced sensing process 1000 may be performed by a collaborative enhanced sensing system. In some examples, the collaborative enhanced sensing system can include, for example, the image capture and processing system 100, the image capture device 105A, the image processing device 105B, the image processor 150, the ISP 154, the host processor 152, the collaborative enhanced sensing system 200, the data source(s) 202, the TMC(s) 204, the server(s) 206, the recipient device(s) 208, the vehicle 310, the vehicle 320, the vehicle 330, the UE 402, the UE 404, the UE 406, the UE 408, the RSU 407, the HV 502, the RV1 504, the NV 506, the RSU 508, the obstacle 512, the VRU 522, the HV 602, the RV1 604, the NV 605, the RSU 608, the VRU 622, the vehicle 705, the vehicle 710, the vehicle 715, the vehicle 720, the vehicle 725, the MEC 740, the eNodeB or gNodeB 745, the RSU 750, the TMC 755, the camera 760, the vehicle 805, the vehicle 810, the vehicle 820, the vehicle 830, the vehicle 835, the MEC 840, the eNodeB or gNodeB 845, the RSU 850, the TMC 855, the camera 860, the NN 900, the computing system 1100, the processors 1110, any other system or device described herein, any component thereof, or a combination thereof.

At operation 1005, the collaborative enhanced sensing system is configured to, and can, obtain sensor data of an environment from one or more sensors. The sensor data includes a plurality of different representations of one or more portions of the environment from a plurality of perspectives. The sensor data may be captured by the one or more sensors. In some examples, two of the different representations are captured by different sensors of the one or more sensors. In some examples, two of the different representations are captured by the same sensor of the one or more sensors. In some examples, the collaborative enhanced sensing system is configured to, and can, obtain sensor data of the environment from the one or more sensors of the at least one device using a transceiver, a receiver, and/or a communication interface 1140. In some examples, the collaborative enhanced sensing system is configured to, and can, obtain sensor data of the environment from the one or more sensors of at least one device. In some examples, the at least one device is non-co-located with the collaborative enhanced sensing system. In some examples, the collaborative enhanced sensing system is configured to, and can, obtain sensor data of the environment from multiple sensors from multiple devices. In some examples, the multiple devices are non-co-located with one another.

Examples of the one or more sensors include the sensor(s) 212, sensor(s) 218, sensor(s) 238, image sensor(s) of camera 335, image sensor(s) of camera 337, sensor(s) of any of the UE(s) of FIG. 4, sensor(s) of the RSU 407, sensor(s) of the HV 502, sensor(s) of the RSU 508, sensor(s) of the HV 502, sensor(s) of the RSU 508, sensor(s) of the HV 602, sensor(s) of the RSU 608, image sensor(s) of the camera 760, sensor(s) of the TMC 755, sensor(s) of the RSU 750, sensor(s) of the eNodeB or gNodeB 745, sensor(s) of any of the vehicles of FIG. 7, image sensor(s) of the camera 860, sensor(s) of the TMC 855, sensor(s) of the RSU 850, sensor(s) of the eNodeB or gNodeB 845, sensor(s) of any of the vehicles of FIG. 8, sensor(s) that capture at least a portion of the sensor data of operation 1005, input devices 1145, or a combination thereof. In some examples, the collaborative enhanced sensing system includes a sensor connector and/or sensor interface and/or transceiver that couples and/or connects the one or more sensors to a remainder of the collaborative enhanced sensing system (e.g., including the processor and/or the memory of the collaborative enhanced sensing system). In some examples, the collaborative enhanced sensing system receives the sensor data from the one or more sensors by receiving the sensor data from, over, and/or using the sensor connector and/or the sensor interface and/or transceiver. In some examples, the collaborative enhanced sensing system includes at least a subset of the one or more sensors. The sensor connector and/or the sensor interface and/or transceiver can include one or more wired and/or wireless interfaces, connectors, and/or transceivers, such as those discussed with respect to the I/O 156, the I/O 160, and/or the communication interface 1140.

In some examples, at least some different portions of the sensor data, and/or of the plurality of different representations of one or more portions of the environment that are from the plurality of perspectives, can be captured by different sensors, which may be on different devices and/or positioned at different locations within the environment. In the context of FIG. 2, different representations can be captured by different data sources 202 and/or by different TMC(s) 204. In the context of FIG. 3, the camera 337 and the camera 335 can capture different representations from different perspectives. In the context of FIG. 4, each of the UEs can capture different representations. In the context of FIGS. 5A-5C, each of the HV 502, the RV1 504, the NV 506, the RSU 508, the obstacle 512, and/or the VRU 522 can capture different portions of the sensor data and/or different representations of the one or more portions of the environment from the plurality of perspectives. In the context of FIG. 6, each of the HV 602, the RV1 604, the NV 606, the RSU, and/or the VRU 622 can capture different portions of the sensor data and/or different representations of the one or more portions of the environment from the plurality of perspectives. In the context of FIG. 7, each of the vehicle 705, the vehicle 710, the vehicle 715, the vehicle 720, the vehicle 725, the RSU 750, the TMC 755, and/or the camera 760 can capture different portions of the sensor data and/or different representations of the one or more portions of the environment from the plurality of perspectives. In the context of FIG. 8, each of the vehicle 805, the vehicle 810, the vehicle 820, the vehicle 830, the vehicle 835, the RSU 850, the TMC 855, and/or the camera 860 can capture different portions of the sensor data and/or different representations of the one or more portions of the environment from the plurality of perspectives. In the context of FIG. 10, each input device 1145 of a plurality of input devices of one or more computing system(s) 1100 can capture different portions of the sensor data and/or different representations of the one or more portions of the environment from the plurality of perspectives.

Examples of the environment include the scene 110, an environment that the data source(s) 202 are in, an environment that the TMC(s) 204 are in, an environment that the server(s) 206 are in, an environment that the recipient device(s) 208 are in, the environment illustrated in FIG. 3, the FOV 340, the FOV 342, the region of interest 350, the region of interest 352, the environment illustrated in FIG. 4, the environment(s) illustrated in FIGS. 5A-5C, the environment(s) illustrated in FIG. 6, the environment illustrated in FIG. 7, the environment illustrated in FIG. 8, the portion of the environment included in the enhanced representation of the environment 870, the portion of the environment included in the enhanced representation of the environment 875, an environment that the computing system 1100 is in, another environment or region or area or location described herein, or a combination thereof.

Examples of different devices that the one or more sensors can be a part of include the image capture and processing system 100, the data source(s) 202, the TMC(s) 204, the server(s) 206, the recipient device(s) 208, the vehicle 310, the vehicle 320, the vehicle 330, the UE 402, the UE 404, the UE 406, the UE 408, the RSU 407, the HV 502, the RV1 504, the NV 506, the RSU 508, the obstacle 512, the VRU 522, the HV 602, the RV1 604, the NV 605, the RSU 608, the VRU 622, the vehicle 705, the vehicle 710, the vehicle 715, the vehicle 720, the vehicle 725, the MEC 740, the eNodeB or gNodeB 745, the RSU 750, the TMC 755, the camera 760, the vehicle 805, the vehicle 810, the vehicle 820, the vehicle 830, the vehicle 835, the MEC 840, the eNodeB or gNodeB 845, the RSU 850, the TMC 855, the camera 860, the computing system 1100, or combinations thereof. In some examples, the devices can be non-co-located (e.g., at least a distance away from, not co-located, not in a shared location, and/or not in a shared area) relative to one another and/or relative to the collaborative enhanced sensing system. In some examples, a first one of the devices can be co-located with at least a second one of the devices and/or with the collaborative enhanced sensing system.

In some examples, the collaborative enhanced sensing system is configured to, and can, identify a vehicle in the environment. Examples of the vehicle include a vehicle that includes the image capture and processing system 100, a vehicle of the data source(s) 202, a vehicle of the recipient device(s) 208, the vehicle 310, the vehicle 320, the vehicle 330, the UE 402, the UE 404, the UE 406, the UE 408, the HV 502, the RV1 504, the NV 506, the obstacle 512, the VRU 522, the HV 602, the RV1 604, the NV 605, the VRU 622, the vehicle 705, the vehicle 710, the vehicle 715, the vehicle 720, the vehicle 725, the vehicle 805, the vehicle 810, the vehicle 820, the vehicle 830, the vehicle 835, a vehicle that includes the NN 900, a vehicle that includes the computing system 1100, any other vehicle described herein, or a combination thereof.

In some examples, identifying the vehicle in the environment can include identifying the vehicle in the sensor data, for instance using the object tracking engine 228. In some examples, identifying the vehicle in the environment includes receiving information indicating that the vehicle is present in the environment, such as a communication from a vehicle computing system of the vehicle that the vehicle computing system of the vehicle sends while the vehicle is in the environment. In some examples, the collaborative enhanced sensing system is the vehicle. In some examples, identifying the vehicle in the environment can include identifying the environment that the vehicle is in.

In some examples, identifying the vehicle in the environment can include identifying a vehicle whose field of view is limited, identifying a vehicle whose field of view is at least partially blocked, identifying a vehicle in a risky situation (e.g., collision or other accident imminent), identifying a vehicle that is planning to perform a risky maneuver (e.g., likely to result in a collision or other accident), or a combination thereof. Examples include, for instance, identifying vehicle 310 because the planned route 315 is risky, identifying the HV 502 and/or the NV 506 due to their proximity and/or the NV 506 being the HV 502's blind spot, identifying the HV 502 and/or the RV1 504 the due to the obstacle 512, identifying the HV 502 and/or the RV1 504 the due to the VRU 522, identifying the HV 602 and/or the NV 606 due to their proximity and/or the NV 606 being the HV 602's blind spot, identifying the HV 602 and/or the NV 606 and/or the RV1 604 due to the VRU 622, identifying the vehicle 705 due to the vehicle 705's limited FOV of the environment that is blocked by the vehicle 720, identifying the vehicle 710 due to the vehicle 710's limited FOV of the environment that is blocked by the vehicle 725, identifying the vehicle 810 due to the vehicle 810's limited FOV of the portion of the environment included in the enhanced representation of the environment 870 (that is blocked by the vehicle 830) and/or because of the planned route 815, identifying the vehicle 820 due to the vehicle 820's limited FOV of the portion of the environment included in the enhanced representation of the environment 875 (that is blocked by the vehicle 835) and/or because of the planned route 825, identifying a vehicle using the NN 900, identifying a vehicle using the object tracking engine 228, or a combination thereof.

In some examples, receiving the sensor data of the environment as in operation 1005 includes receiving at least a portion of the sensor data that includes at least one of the plurality of different representations from a second vehicle in the environment, from a roadside unit (RSU) in the environment, from a camera in the environment, from a depth sensor in the environment, or a combination thereof. Examples of the second vehicle include any of the examples of the vehicle listed above. Examples of the RSU include the data source(s) 202, the TMC 204, the server(s) 206, the RSU 407, the RSU 508, the RSU 608, the RSU 750, the TMC 755, the RSU 850, the TMC 855, or a combination thereof. Examples of the camera include any of the examples of the one or more sensors listed above that can include camera(s) and/or image sensor(s).

In some examples, the plurality of different representations include image data captured using at least one image sensor, such as the image sensor 130 of the image capture and processing system 100 and/or an image sensor of one of the cameras illustrated and/or described herein. In some examples, the plurality of different representations include depth data captured using at least one depth sensor, such as one or more LIDAR sensors, one or more RADAR sensors, one or more SODAR sensors, one or more SONAR sensors, one or more ToF sensors, one or more structured light sensors, one or more ultrasound sensors, one or more rangefinders, or combinations thereof. In some examples, the sensor data can include positioning data captured by a positioning receiver, such as a GNSS receiver, an IMU, an accelerometer, a gyroscope, a gyrometer, a barometer, an altimeter, or a combination thereof. The positioning receiver may be a positioning receiver of the vehicle, and/or a positioning receiver coupled to the vehicle.

In some examples, at least one of the plurality of different representations is received from the vehicle. In some examples, at least one of the plurality of different representations is received from a first vehicle other than the vehicle. In some examples, at least one of the plurality of different representations is received from a second vehicle other than the vehicle. In some examples, at least one of the plurality of different representations is received from an RSU. In some examples, at least one of the plurality of different representations is received from a second RSU. In some examples, at least one of the plurality of different representations is received from an MEC. In some examples, at least one of the plurality of different representations is received from a TMC 204.

At operation 1010, the collaborative enhanced sensing system is configured to, and can, identify a subset of the plurality of different representations of the one or more portions of environment based on context corresponding to the vehicle in the environment. The context includes at least a position of the vehicle in the environment. The subset of the plurality of different representations of the one or more portions of environment that are identified can be the subset of the plurality of different representations of the one or more portions of environment that are most relevant for the vehicle, that are include portions of the environment and/or perspectives on the environment that are difficult to sense from a perspective of the vehicle (e.g., due to an obstruction, an environmental scene condition, a sensor condition, and/or any of the other reasons discussed further below), that include portions of the environment and/or perspectives on the environment to be included in the enhanced representation of the environment, or a combination thereof. In some examples, the subset of the plurality of different representations of the one or more portions of environment are identified using the object tracking engine 228, the data fusion engine 230, the alert engine 244, the trained ML model(s) 232, or a combination thereof. In some examples, the identification of the subset of the plurality of different representations of the one or more portions of environment is performed automatically by the collaborative enhanced sensing system. In some examples, the identification of the subset of the plurality of different representations of the one or more portions of environment is performed automatically based on a selection (e.g., by a user through a user interface) and/or a preference (e.g., associated with a user). The selection and/or preference can be associated with a user, such an operator of the vehicle, an operator of a second vehicle in the environment, an operator of the data source(s) 202, an operator of the TMC 204, an operator of the server(s) 206, an operator of the recipient device(s) 208, an operator of at least a portion of the collaborative enhanced sensing system, or a combination thereof.

In some examples, identifying the subset of the plurality of different representations based on the context includes identifying one or more representations of a portion of the environment that includes the position of the vehicle, and/or that is adjacent to the position of the vehicle, and/or that is within a predetermined range of the position of the vehicle. For instance, the vehicle 310 is included in the representation(s) of the environment captured by the camera 337 based on the FOV 342, the vehicle 320 is included in the representation(s) of the environment captured by the camera 335 based on the FOV 340, the UEs 402-406 are included in representation(s) of the environment captured by the RSU 407 based on the range 401, the various vehicles 502-506 and/or the RSU 508 are included in the representation(s) of the environment captured by the various vehicles 502-506 and/or the RSU 508, the various vehicles 602-606 and/or the RSU 608 are included in the representation(s) of the environment captured by the various vehicles 602-606 and/or the RSU 608, the vehicle 725 is included in the representation(s) of the environment captured by the vehicle 710 and/or in the representation(s) of the environment captured by the camera 760 and/or in the representation(s) of the environment captured by the vehicle 715, the vehicle 720 is included in the representation(s) of the environment captured by the vehicle 705 and/or in the representation(s) of the environment captured by the TMC 755, the vehicle 715 is included in the representation(s) of the environment captured by the vehicle 720, the vehicles 830-835 are included in the representation(s) of the environment captured by the vehicles 810-820 and/or the representation(s) of the environment captured by the camera 860 and/or the representation(s) of the environment captured by the vehicle 805, the vehicles 810-820 are included in the representation(s) of the environment captured by the camera 860, the vehicle 805 is included in the representation(s) of the environment captured by the vehicle 830, and the like.

In some examples, the context includes a direction of travel of the vehicle in the environment, and identifying the subset of the plurality of different representations based on the context includes identifying one or more representations of a portion of the environment ahead of the vehicle in the direction of travel of the vehicle. For instance, the region of interest 350 in the FOV 340 of the camera 335 is in a direction of travel of the vehicle 310 based on the planned route 315, the region of interest 352 in the FOV 342 of the camera 337 is in a direction of travel of the vehicle 320 based on the planned route 325, the intersection and northern road of FIG. 8 are in a direction of travel of the vehicle 810 based on the planned route 815, the intersection and southern road of FIG. 8 are in a direction of travel of the vehicle 820 based on the planned route 825, and the like.

In some examples, the context includes a speed of the vehicle in the environment, and identifying the subset of the plurality of different representations based on the context includes identifying one or more representations of a portion of the environment ahead of the vehicle. A size of the portion of the environment can be based on speed of the vehicle. For instance, the portion of the environment included in the enhanced representation of the environment 870 for the vehicle 810 extends further in front of and to the right of the vehicle 810 than in other directions because the speed of the vehicle 810 is higher in those directions (as indicated by the planned route 815) than in other directions. Similarly, the portion of the environment included in the enhanced representation of the environment 875 for the vehicle 820 extends further in front of and to the left of the vehicle 820 than in other directions because the speed of the vehicle 820 is higher in those directions (as indicated by the planned route 825) than in other directions.

In some examples, the context includes a planned movement of the vehicle in the environment, and identifying the subset of the plurality of different representations based on the context includes identifying one or more representations of a portion of the environment ahead of the vehicle according to the planned movement of the vehicle. Examples of the planned movement of the vehicle include the planned route 315, the planned route 325, the planned route 815, and/or the planned route 825.

In some examples, the collaborative enhanced sensing system is configured to, and can, detect an indicator light of the vehicle in the sensor data and determine the planned movement of the vehicle based on detecting the indicator light of the vehicle in the sensor data. For instance, in some examples, the indicator light can be a turn indicator light, and the planned movement of the vehicle can be a turn, as in the planned route 315, the planned route 815, and/or the planned route 825. In some examples, the indicator light can be a brake light, and the planned movement of the vehicle can be a slowdown or stop.

In some examples, the collaborative enhanced sensing system is configured to, and can, detect a current path of the vehicle based on the sensor data and determine the planned movement of the vehicle based on the current path of the vehicle. For instance, the planned route 315 is an extension of the current path of the vehicle 310 combined with the turn indication, the planned route 325 is an extension of the current path of the vehicle 320, the planned route 815 is an extension of the current path of the vehicle 810 combined with the turn indication, and the planned route 825 is an extension of the current path of the vehicle 820 combined with the turn indication.

In some examples, the collaborative enhanced sensing system is configured to, and can, receive an indication of the planned movement of the vehicle from the vehicle (e.g., from a vehicle computing device of the vehicle), and the planned movement of the vehicle can be part of a planned route for the vehicle. For instance, the collaborative enhanced sensing system can receive an indication of the planned route 315 from the vehicle 310, can receive an indication of the planned route 325 from the vehicle 320, can receive an indication of the planned route 815 from the vehicle 810, and/or can receive an indication of the planned route 825 from the vehicle 820.

In some examples, the context includes an object in the environment other than the vehicle, such as a second vehicle, a pedestrian (e.g., VRU 522, VRU 622), a bicycle, a bicyclist, a motorcycle, a motorcyclist, a scooter, a scooter operator, a structure (e.g., a building, a lamp post, a RSU), a plant (e.g., a tree), an animal, a rock, a pothole, a spill on the road, debris, the obstacle 512, or a combination thereof. In some examples, identifying the subset of the plurality of different representations based on the context includes identifying one or more representations of a portion of the environment that includes the object. In some examples, the collaborative enhanced sensing system is configured to, and can, identify, based on one or more planned movements of the vehicle, a risk of a collision between the vehicle and an object in the environment. The collaborative enhanced sensing system can cause an alert that is based on the enhanced representation of the environment to be output at the vehicle. The alert can indicate the risk of the collision between the vehicle and the object. The alert 345 is an example of the alert indicating a risk of the likely collision 370 between the vehicle 310 and an object (e.g., the second vehicle 320). The alert may be generated using the alert engine 244.

In some examples, the context includes a planned movement of an object in the environment other than the vehicle, such as a second vehicle, a pedestrian (e.g., VRU 522, VRU 622), a bicycle, a bicyclist, a motorcycle, a motorcyclist, a scooter, a scooter operator, a structure, a plant, an animal, a rock, a pothole, a spill on the road, debris, the obstacle 512, or a combination thereof. In some examples, identifying the subset of the plurality of different representations based on the context includes identifying one or more representations of a portion of the environment ahead of the vehicle according to the planned movement of the object. The alert 345 is an example of the alert indicating a risk of the likely collision 370 between the vehicle 310 and an object (e.g., the second vehicle 320) based on a planned movement of the object (e.g., the planned route 325 of the second vehicle 320). The alert may be generated using the alert engine 244. In some examples, the context may identify a walking path of a pedestrian (e.g., the pedestrian is crossing the street or is likely to cross the street), and the alert may indicate a risk of a collision between the vehicle and the pedestrian. In some examples, the collaborative enhanced sensing system can receive an indication of the planned route of the object from a device associated with the object, such as a mobile handset or other user device of a pedestrian. In some examples, the collaborative enhanced sensing system can detect an indication of the planned route of the object from representation(s) of the environment, such as a crosswalk detector light(s) indicating that pedestrian(s) are currently crossing, or a crosswalk light indicating "walk," "stop," or "hurry."

In some examples, identifying the subset of the plurality of different representations based on the context includes identifying that confidence levels associated with each of the subset of the plurality of different representations exceed a confidence level threshold. A confidence level of one of the plurality of different representations is associated with confidence that the one of the plurality of different representations representing a portion of the environment that includes the vehicle and/or that includes an area ahead of the vehicle. In some examples, the portion of the environment ahead of the vehicle includes the vehicle.

In some examples, the confidence level is based on a resolution of the one of the plurality of different representation. For instance, higher resolution representations (e.g., higher resolution images) can correspond to higher confidence levels due to representation(s) of the vehicle in the higher resolution representations appearing sharper and more clear while representation(s) of the vehicle in lower resolution representations (e.g., lower resolution images) might appear more blurry or pixelated. In some examples, the confidence level is based on a level of illumination in the one of the plurality of different representations. In some examples, the confidence level is based on object detection using the one of the plurality of different representations. In some examples, the confidence level can be based on a confidence level associated with object detection and/or recognition and/or tracking by the object tracking engine 228, a confidence level of data fusion associated with the data fusion engine 230, confidence level for an alert associated with the alert engine 244, a confidence level associated with the output(s) of the trained ML model(s) 232, a confidence level associated with the output(s) of the NN 900, a confidence level in data from a particular one of the data source(s) 202, a confidence level in data from the TMC 204, a confidence level associated with the traffic control engine 222, or a combination thereof.

For instance, well-illuminated representations (e.g., images that are neither overexposed nor underexposed) can correspond to higher confidence levels due to representation(s) of the vehicle in the well-illuminated representations having clear lines and distinct colors while representation(s) of the vehicle in the poorly-illuminated representations (e.g., images that are overexposed and/or underexposed) might appear too bright or too dim to clearly distinguish clear lines and distinct colors.

In some examples, the collaborative enhanced sensing system is configured to, and can, receive traffic data from a traffic management controller. The context can include at least a portion of the traffic data. The portion of the traffic data can associated with at least a portion of the environment that includes the vehicle. For instance, the traffic data can include traffic data detected and/or reported by the data source(s) 202, the TMC 204, the server(s) 206, the receiving device(s) 208, the traffic control engine 222, the RSU 407, the RSU 508, the RSU 608, the RSU 750, the TMC 755, the RSU 850, the TMC 855, any of the examples of the one or more sensors listed above, any traffic data described herein, or a combination thereof.

In some examples, identifying the subset of the plurality of different representations based on the context corresponding to the vehicle in the environment includes inputting the sensor data and the context into one or more trained machine learning (ML) models (e.g., the trained ML model(s) 232 and/or the NN 900) that output an indication of the subset of the plurality of different representations. For instance, the trained ML model(s) can be associated with the object tracking engine 228, the data fusion engine 230, the traffic control engine 222, the alert engine 244, or a combination thereof. In some examples, the collaborative enhanced sensing system is configured to, and can, identify a reaction of the vehicle in response to receiving the enhanced representation of the environment, and can update the one or more trained machine learning models using the context, the subset of the plurality of different representations, and/or the reaction as training data. For instance, the reaction can be treated as feedback by the feedback engine 234, and can be used to train the trained ML model(s) 232.

At operation 1015, the collaborative enhanced sensing system is configured to, and can, cause an enhanced representation of the environment for the vehicle to be generated at least in part based on consolidating the subset of the plurality of different representations. In some examples, the collaborative enhanced sensing system is configured to, and can, generate the enhanced representation of the environment for the vehicle at least in part based on consolidating the subset of the plurality of different representations. In some examples, the collaborative enhanced sensing system is configured to, and can, consolidate the subset of the plurality of different representations and send the consolidated subset of the plurality of different representations to another computing system that generates the enhanced representation of the environment for the vehicle based on the consolidated subset of the plurality of different representations. Examples of the enhanced representation of the environment include an enhanced representation of an environment generated using the data fusion engine 230, an enhanced representation of an environment generated using the alert engine 244, an enhanced representation of the environment in the alert 345 for the vehicle 310 (e.g., since much of the perspective and/or FOV of the vehicle 310 is blocked by the vehicle 330), the enhanced representation of the environment 870 for the vehicle 810 (e.g., since much of the perspective and/or FOV of the vehicle 810 is blocked by the vehicle 830), the enhanced representation of the environment 875 for the vehicle 820 (e.g., since much of the perspective and/or FOV of the vehicle 820 is blocked by the vehicle 835), and other enhanced representation(s) of environment(s) described herein.

In some examples, the enhanced representation of the environment includes a representation of a portion of the environment that is difficult to sense from a perspective (e.g., field of view) of the vehicle (e.g., from a perspective of one or more sensors of the vehicle, from a perspective of an operator of the vehicle, from a perspective of a passenger of the vehicle, or a combination thereof). In some examples, the enhanced representation of the environment includes a representation of a portion of the environment that is impossible to sense from a perspective of the vehicle. In some examples, the enhanced representation of the environment includes a representation of a portion of the environment that is at least partially blocked and/or occluded from a perspective of the vehicle, for instance by an obstacle or occlusion. Examples of the obstacle or occlusion include a second vehicle, a pedestrian (e.g., VRU 522, VRU 622), a bicycle, a bicyclist, a motorcycle, a motorcyclist, a scooter, a scooter operator, a structure (e.g., a building, a lamp post, an RSU), a plant (e.g., a tree), an animal, a rock, debris, the obstacle 512, fog, rain, smog, snow, hail, a weather condition, an environmental scene condition, or a combination thereof. In some examples, the enhanced representation of the environment includes a representation of a portion of the environment that is difficult to sense from the perspective of the vehicle because of a lighting condition and/or illumination condition, such as low or dim lighting (e.g., below a lighting or illumination level threshold) that causes the environment to appear dim and/or underexposed, excessively bright lighting (e.g., exceeding a lighting or illumination level threshold) that causes the environment to appear washed out and/or overexposed, lighting that casts shadows in the environment or on a sensor that affect the representation of the portion of the environment, lighting that produces visual artifacts (e.g., lens flare or bokeh) over a view of the environment that affect the representation of the portion of the environment, or a combination thereof. In some examples, the enhanced representation of the environment includes a representation of a portion of the environment that is difficult to sense from the perspective of the vehicle because of a condition of a sensor of the vehicle, for instance because the sensor is defective or damaged, the sensor's wiring is faulty, the sensor has become decalibrated, an occlusion or impairment has affected a component associated with the sensor (e.g., a camera lens is smudged, dirty, fogged up, scratched, cracked, broken, or a combination thereof), the sensor has a low resolution (e.g., resolution below a threshold), the sensor has a low accuracy (e.g., accuracy below a threshold), the sensor has a low quality (e.g., quality below a threshold), or a combination thereof. In some examples, the enhanced representation of the environment includes a representation of a portion of the environment that is difficult to sense from the perspective of the vehicle because detection and/or tracking of one or more objects in the portion of the environment based on sensor(s) of the vehicle fails or results in a detection and/or tracking of the object with a low level of confidence (e.g., confidence below a threshold).

In some examples, causing the enhanced representation of the environment for the vehicle to be generated at least in part based on consolidating the subset of the plurality of different representations includes fusing together at least two different representations of the subset of the plurality of different representations, for instance using the data fusion engine 230. For example, an enhanced representation of the environment generated using the data fusion engine 230 can include a fusion of two different representations from two different data sources 202, a data source and a TMC 204, two TMCs 204, and the like. The enhanced representation of the environment in the alert 345 for the vehicle 310 can be based on a fusion of image data from the camera 337 and image data from the camera 335. The enhanced representation of the environment 870 for the vehicle 810 can be based on a fusion of sensor data from the camera 860, the sensor(s) of the vehicle 810, the sensor(s) of the vehicle 830, the sensor(s) of the vehicle 805, the sensor(s) of the vehicle 820, and/or the sensor(s) of the vehicle 835. The enhanced representation of the environment 875 for the vehicle 820 can be based on a fusion of sensor data from the camera 860, the sensor(s) of the vehicle 820, the sensor(s) of the vehicle 835, the sensor(s) of the vehicle 810, the sensor(s) of the vehicle 830, the sensor(s) of the vehicle 805, and/or the sensor(s) of the TMC 855. In some examples, the at least two different representations include an image captured by an image sensor and a depth dataset captured by a depth sensor. Fusing together the at least two different representations can include associating portions of the image with corresponding portions of the depth dataset that represent corresponding portions of the environment. Thus, different pixels of the image can be associated with different depths from across the depth dataset. For instance, if the camera 860 of FIG. 8 includes both a depth sensor and an image sensor, the fusion of the depth data from the depth sensor and the image data from the image sensor can result in a depth image of the environment in FIG. 8 that depicts the vehicle 830, the vehicle 835, the vehicle 810, and the vehicle 820, indicates that the vehicle 830 is closer to the camera 860 than the vehicle 835, and indicates that the vehicle 810 is closer to the camera 860 than the vehicle 8205.

In some examples, the collaborative enhanced sensing system is configured to, and can, cause an indication of the enhanced representation of the environment to be output at the vehicle. In some examples, the indication includes an alert based on the enhanced representation of the environment. In some examples, the indication includes at least a portion of the enhanced representation of the environment. In some examples, the indication and/or alert may include at least a portion of the enhanced representation of the environment. In some examples, the indication and/or alert may include a warning to the vehicle (and/or an operator of the vehicle) based on the enhanced representation of the environment, for instance indicating a risk of collision between the vehicle and another object, such as a second vehicle, a pedestrian (e.g., VRU 522, VRU 622), a bicycle, a bicyclist, a motorcycle, a motorcyclist, a scooter, a scooter operator, a structure (e.g., a building, a lamp post, a RSU), a plant (e.g., a tree), an animal, a rock, a pothole, a spill on the road, debris, the obstacle 512, or a combination thereof. Examples of the indication and/or alert include the alert 345. The indication and/or alert maybe generated using the alert engine 244, the data fusion engine 230, the object tracking engine 228, the traffic control engine 222, the trained ML model(s) 232, or a combination thereof. In some examples, causing the indication of the enhanced representation of the environment to be output at the vehicle includes sending the indication to the vehicle. In some examples, causing the indication of the enhanced representation of the environment to be output at the vehicle includes outputting the indication at the vehicle, using one or more output devices (e.g., output device(s) 242, output device 1135).

In some examples, the collaborative enhanced sensing system is configured to, and can identify, based on one or more planned movements of the vehicle, a risk of a collision between the vehicle and an object. The collaborative enhanced sensing system can cause an indication and/or an alert that is based on the enhanced representation of the environment to be output at the vehicle. The indication and/or alert indicates the risk of the collision between the vehicle and the object. The alert 345 is an example of the alert indicating a risk of the likely collision 370 between the vehicle 310 and an object (e.g., the second vehicle 320).

In some examples, the collaborative enhanced sensing system may use intelligence in how that alert is provided to, and/or caused to be output at, the vehicle. For example, an RSU of the collaborative enhanced sensing system may broadcast and/or groupcast different groups of information, and via point-to-point communication, may indicate to the vehicle which of the broadcast and/or groupcast information is relevant specifically to that vehicle. In some examples, an MEC and/or RSU of the collaborative enhanced sensing system can identify the relevant sensor data and identifies how to group this data from multiple vehicles into broadcast and/or groupcast streams.

In some examples, the collaborative enhanced sensing system that performs the process 1000 includes a computing device that is remote from the vehicle, such as a multi-access edge computing (MEC) system (e.g., server(s) 206, MEC 740, MEC 840), a roadside unit (RSU) system (e.g., server(s) 206, TMC 204, RSU 407, RSU 508, RSU 608, RSU 750, RSU 850), a remote server (e.g., server(s) 206), or a vehicle computing device is part of a second vehicle in the environment. Examples of the second vehicle include any of the examples of the vehicle listed above. In some examples, the collaborative enhanced sensing system causes an indication of the enhanced representation of the environment to be output at the vehicle at least in part by sending the indication of the enhanced representation of the environment to the vehicle from the computing device that is remote from the vehicle.

In some examples, the collaborative enhanced sensing system that performs the process 1000 includes a vehicle computing device of the vehicle. In some examples, the collaborative enhanced sensing system causes an indication of the enhanced representation of the environment to be output at the vehicle at least in part by outputting the indication of the enhanced representation of the environment using an output device of the vehicle, such as the output device(s) 242 and/or output device 1135. The output device can include, for example, a display, a speaker, a set of headphones, a headset, a tactile feedback actuator, or a combination thereof. For instance, outputting the alert that is based on the enhanced representation of the environment using the output device of the vehicle can include displaying the alert using a display of the vehicle, playing the alert using a speaker of the vehicle, providing a tactile feedback alert using a tactile feedback actuator, the output device(s) 242, the output device 1135, or a combination thereof.

In some examples, the vehicle, and/or the vehicle computing system associated with the vehicle, can be optimized to reduce latency and/or increase accuracy. A computing device that is remote from the vehicle, such as an MEC, RSU, or server, can have more computational resources and computational time available to perform operations of the process 1000 and/or that are described herein as being associated with the process 1000, such as tracking objects, predicting potential collisions, and/or figuring out how to optimize information for those vehicles. For instance, in some examples, a computing device that is remote from the vehicle can run a higher latency trained ML model (that may have a higher accuracy) than some vehicles are able to run due to increased computational resources and/or increased computational time during which those computational resources can be accessed and used for these operations. Thus, in some examples, a vehicle computing system might fail to detect and/or track an object in the environment using a low-latency trained ML model, but computing device that is remote from the vehicle can successfully detect and/or track the object in the environment using a higher-latency higher-accuracy trained ML model, and can send an indication of the position and/or movement(s) of the object to the vehicle (and/or generate the enhanced representation of the environment based on the position and/or movement(s) of the object). The vehicle computing system can even use the input from the computing device that is remote from the vehicle to retrain and/or update its trained ML model to help optimize its weighting to reduce the chance of failing to detect and/or track an object.

In some examples, mechanisms and/or techniques for providing the data to, and/or receiving data at, various types of computing devices that are part of the collaborative enhanced sensing system that performs the process 1000 can vary. For instance, an MEC of the collaborative enhanced sensing system can receive data using a 5G Uu link. An RSU of the collaborative enhanced sensing system can receive data using PC5. Some mechanisms and/or techniques for providing and/or receiving data can have limited bandwidth capabilities (e.g., constrained for licensed bandwidth), such as PC5. In situation where such mechanisms and/or techniques for providing and/or receiving data have limited bandwidth capabilities, data being transferred (e.g., sensor data and/or indication(s) of the enhanced representation of the environment) can be compressed before being sent to and/or received at the computing device(s) that are part of the collaborative enhanced sensing system. Transfer mechanisms and/or techniques can be optimized for limited bandwidth usage, for instance by transferring smaller portions of data at a time, not transferring redundant data, compressing the data, using or increasing error checking (e.g., via Automatic Repeat Request (ARQ) and/or Hybrid ARQ (HARQ) schemes), bandwidth throttling, or combinations thereof.

In some examples, the imaging system can includes: means for receiving sensor data of an environment, wherein the sensor data includes a plurality of different representations of one or more portions of the environment from a plurality of perspectives; means for identifying a subset of the plurality of different representations of the one or more portions of the environment based on context corresponding to a vehicle in the environment, wherein the context includes at least a position of the vehicle in the environment; and means for generating an enhanced representation of the environment for the vehicle at least in part based on consolidating the subset of the plurality of different representations.

In some examples, the means for receiving the sensor data includes the image capture and processing system 100, the image capture device 105A, the image processing device 105B, the image processor 150, the ISP 154, the host processor 152, the image sensor 130, the sensor(s) 212, the sensor(s) 218, the sensor(s) 238, the image sensor(s) of camera 335, the image sensor(s) of camera 337, the sensor(s) of any of the UE(s) of FIG. 4, the sensor(s) of the RSU 407, the sensor(s) of the HV 502, the sensor(s) of the RSU 508, the sensor(s) of the HV 502, the sensor(s) of the RSU 508, the sensor(s) of the HV 602, the sensor(s) of the RSU 608, the image sensor(s) of the camera 760, the sensor(s) of the TMC 755, the sensor(s) of the RSU 750, the sensor(s) of the eNodeB or gNodeB 745, the sensor(s) of any of the vehicles of FIG. 7, the image sensor(s) of the camera 860, the sensor(s) of the TMC 855, the sensor(s) of the RSU 850, the sensor(s) of the eNodeB or gNodeB 845, the sensor(s) of any of the vehicles of FIG. 8, the sensor(s) that capture at least a portion of the sensor data of operation 1005, the input devices 1145, the or a combination thereof another sensor described herein, or a combination thereof.

In some examples, the means for identifying the subset of the plurality of different representations includes image capture and processing system 100, the image capture device 105A, the image processing device 105B, the image processor 150, the ISP 154, the host processor 152, the collaborative enhanced sensing system 200, the data source(s) 202, the TMC(s) 204, the server(s) 206, the recipient device(s) 208, the traffic control engine 222, the object tracking engine 228, the data fusion engine 230, the trained ML module(s) 232, the vehicle 310, the vehicle 320, the vehicle 330, the UE 402, the UE 404, the UE 406, the UE 408, the RSU 407, the HV 502, the RV1 504, the NV 506, the RSU 508, the obstacle 512, the VRU 522, the HV 602, the RV1 604, the NV 605, the RSU 608, the VRU 622, the vehicle 705, the vehicle 710, the vehicle 715, the vehicle 720, the vehicle 725, the MEC 740, the eNodeB or gNodeB 745, the RSU 750, the TMC 755, the camera 760, the vehicle 805, the vehicle 810, the vehicle 820, the vehicle 830, the vehicle 835, the MEC 840, the eNodeB or gNodeB 845, the RSU 850, the TMC 855, the camera 860, the NN 900, the computing system 1100, the processors 1110, any other system or device described herein, any component thereof, or a combination thereof.

In some examples, the means for causing an indication of the enhanced representation to be output at the vehicle includes the image capture and processing system 100, the image capture device 105A, the image processing device 105B, the image processor 150, the ISP 154, the host processor 152, the collaborative enhanced sensing system 200, the data source(s) 202, the TMC(s) 204, the server(s) 206, the recipient device(s) 208, the traffic control engine 222, the object tracking engine 228, the data fusion engine 230, the alert engine 244, the trained ML module(s) 232, the vehicle 310, the vehicle 320, the vehicle 330, the UE 402, the UE 404, the UE 406, the UE 408, the RSU 407, the HV 502, the RV1 504, the NV 506, the RSU 508, the obstacle 512, the VRU 522, the HV 602, the RV1 604, the NV 605, the RSU 608, the VRU 622, the vehicle 705, the vehicle 710, the vehicle 715, the vehicle 720, the vehicle 725, the MEC 740, the eNodeB or gNodeB 745, the RSU 750, the TMC 755, the camera 760, the vehicle 805, the vehicle 810, the vehicle 820, the vehicle 830, the vehicle 835, the MEC 840, the eNodeB or gNodeB 845, the RSU 850, the TMC 855, the camera 860, the NN 900, the computing system 1100, the processors 1110, any other system or device described herein, any component thereof, or a combination thereof.

In some examples, the processes described herein (e.g., the imaging processes of FIG. 1, the collaborative enhanced sensing processes of FIG. 2, the detection and alert processes of FIG. 3, the communication processes of FIG. 4, the detection and communication processes of FIGS. 5A-5D, the detection and communication processes of FIG. 6, the collaborative enhanced sensing processes of FIG. 7, the collaborative enhanced sensing processes of FIG. 8, the neural network processes of FIG. 9, the collaborative enhanced sensing process 1000 of FIG. 10, the computing processes of FIG. 11, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the collaborative enhanced sensing system 200, the data source(s) 202, the TMC(s) 204, the server(s) 206, the recipient device(s) 208, the vehicle 310, the vehicle 320, the vehicle 330, the UE 402, the UE 404, the UE 406, the UE 408, the RSU 407, the HV 502, the RV1 504, the NV 506, the RSU 508, the obstacle 512, the VRU 522, the HV 602, the RV1 604, the NV 605, the RSU 608, the VRU 622, the vehicle 705, the vehicle 710, the vehicle 715, the vehicle 720, the vehicle 725, the MEC 740, the eNodeB or gNodeB 745, the RSU 750, the TMC 755, the camera 760, the vehicle 805, the vehicle 810, the vehicle 820, the vehicle 830, the vehicle 835, the MEC 840, the eNodeB or gNodeB 845, the RSU 850, the TMC 855, the camera 860, the NN 900, the computing system 1100, the processors 1110, any other system or device described herein, any component thereof, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
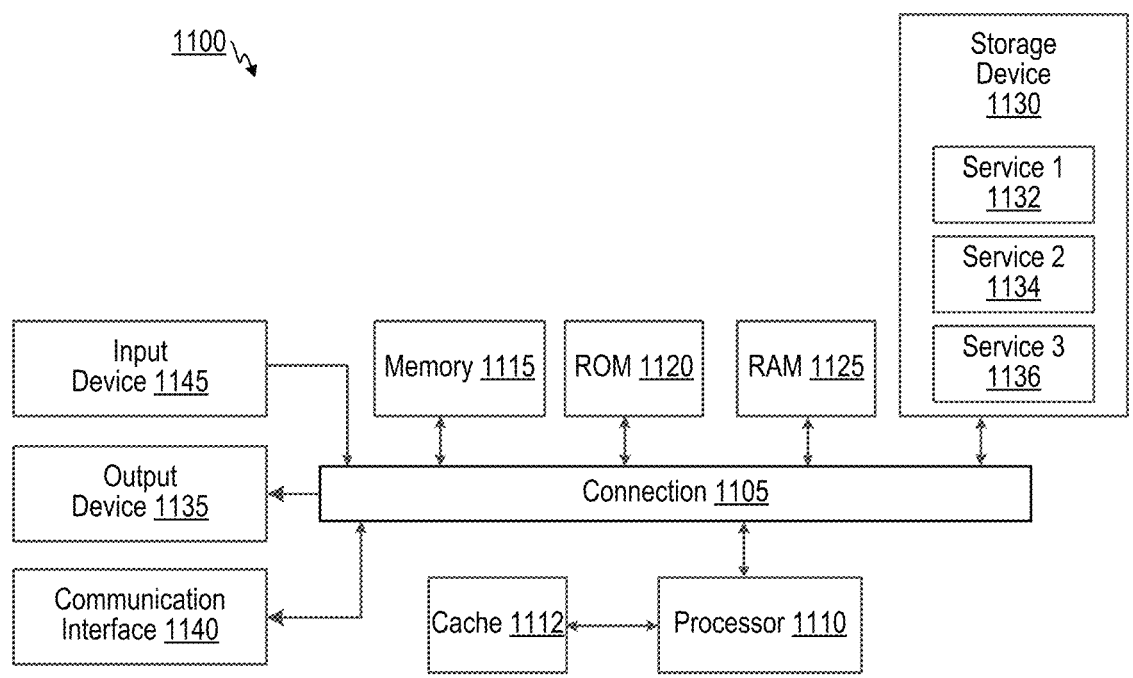
FIG. 11 is a diagram illustrating an example of a computing system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105.

Connection 1105 can be a physical connection using a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1102.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for media processing, the apparatus comprising: a memory; and one or more processors coupled to the memory, the one or more processors configured to: obtain sensor data of an environment from one or more sensors of at least one device, wherein the sensor data includes a plurality of different representations of one or more portions of the environment from a plurality of perspectives; identify a subset of the plurality of different representations of the one or more portions of the environment based on context corresponding to a vehicle in the environment, wherein the context includes at least a position of the vehicle in the environment; and cause an enhanced representation of the environment for the vehicle to be generated at least in part based on consolidating the subset of the plurality of different representations.

Aspect 2. The apparatus of Aspect 1, wherein to identify the subset of the plurality of different representations based on the context, the one or more processors are configured to identify one or more representations of a portion of the environment that includes the position of the vehicle.

Aspect 3. The apparatus of any of Aspects 1 to 2, wherein the context includes a direction of travel of the vehicle in the environment, wherein to identify the subset of the plurality of different representations based on the context, the one or more processors are configured to identify one or more representations of a portion of the environment ahead of the vehicle in the direction of travel of the vehicle.

Aspect 4. The apparatus of any of Aspects 1 to 3, wherein the context includes a speed of the vehicle in the environment, wherein to identify the subset of the plurality of different representations based on the context, the one or more processors are configured to identify one or more representations of a portion of the environment ahead of the vehicle, wherein a size of the portion of the environment is based on speed of the vehicle.

Aspect 5. The apparatus of any of Aspects 1 to 4, wherein the context includes a planned movement of the vehicle in the environment, wherein to identify the subset of the plurality of different representations based on the context, the one or more processors are configured to identify one or more representations of a portion of the environment ahead of the vehicle according to the planned movement of the vehicle.

Aspect 6. The apparatus of Aspect 5, wherein the one or more processors are configured to: detect an indicator light of the vehicle in the sensor data; and determine the planned movement of the vehicle based on detecting the indicator light of the vehicle in the sensor data, wherein the planned movement of the vehicle is a turn.

Aspect 7. The apparatus of any of Aspects 5 to 6, wherein the one or more processors are configured to: receive an indication of the planned movement of the vehicle from the vehicle, wherein the planned movement of the vehicle is part of a planned route for the vehicle.

Aspect 8. The apparatus of any of Aspects 1 to 7, wherein the context includes an object in the environment other than the vehicle, wherein to identify the subset of the plurality of different representations based on the context, the one or more processors are configured to identify one or more representations of a portion of the environment that includes the object.

Aspect 9. The apparatus of any of Aspects 1 to 8, wherein the one or more processors are configured to: identify, based on one or more planned movements of the vehicle, a risk of a collision between the vehicle and an object in the environment; and cause an alert that is based on the enhanced representation of the environment to be output at the vehicle, wherein the alert indicates the risk of the collision between the vehicle and the object.

Aspect 10. The apparatus of any of Aspects 1 to 9, wherein the context includes a planned movement of an object in the environment other than the vehicle, wherein to identify the subset of the plurality of different representations based on the context, the one or more processors are configured to identify one or more representations of a portion of the environment ahead of the vehicle according to the planned movement of the object.

Aspect 11. The apparatus of any of Aspects 1 to 10, wherein, to identify the subset of the plurality of different representations based on the context, the one or more processors are configured to identify that confidence levels associated with each of the subset of the plurality of different representations exceed a confidence level threshold, wherein a confidence level of one of the plurality of different representations is associated with confidence that the one of the plurality of different representations representing a portion of the environment ahead of the vehicle.

Aspect 12. The apparatus of Aspect 11, wherein the portion of the environment ahead of the vehicle includes the vehicle.

Aspect 13. The apparatus of any of Aspects 11 to 12, wherein the confidence level is based on a resolution of the one of the plurality of different representations.

Aspect 14. The apparatus of any of Aspects 11 to 13, wherein the confidence level is based on a level of illumination in the one of the plurality of different representations.

Aspect 15. The apparatus of any of Aspects 11 to 14, wherein the confidence level is based on object detection using the one of the plurality of different representations.

Aspect 16. The apparatus of any of Aspects 1 to 15, wherein, to receive the sensor data of the environment, the one or more processors are configured to receive at least a portion of the sensor data that includes at least one of the plurality of different representations from a second vehicle in the environment.

Aspect 17. The apparatus of any of Aspects 1 to 16, wherein, to receive the sensor data of the environment, the one or more processors are configured to receive at least a portion of the sensor data that includes at least one of the plurality of different representations from a roadside unit (RSU) in the environment.

Aspect 18. The apparatus of any of Aspects 1 to 17, wherein, to receive the sensor data of the environment, the one or more processors are configured to receive at least a portion of the sensor data that includes at least one of the plurality of different representations from a camera in the environment.

Aspect 19. The apparatus of any of Aspects 1 to 18, wherein the plurality of different representations include depth data captured using at least one depth sensor.

Aspect 20. The apparatus of any of Aspects 1 to 19, wherein the plurality of different representations include image data captured using at least one image sensor.

Aspect 21. The apparatus of any of Aspects 1 to 20, wherein the one or more processors are configured to: receive traffic data from a traffic management controller, wherein the context includes at least a portion of the traffic data, wherein the portion of the traffic data is associated with at least a portion of the environment that includes the vehicle.

Aspect 22. The apparatus of any of Aspects 1 to 21, wherein, to cause the enhanced representation of the environment for the vehicle to be generated at least in part based on consolidating the subset of the plurality of different representations, the one or more processors are configured to fuse together at least two different representations of the subset of the plurality of different representations.

Aspect 23. The apparatus of Aspect 22, wherein the at least two different representations include an image captured by an image sensor and a depth dataset captured by a depth sensor, wherein, to fuse together the at least two different representations, the one or more processors associate portions of the image with corresponding portions of the depth dataset that represent corresponding portions of the environment.

Aspect 24. The apparatus of any of Aspects 1 to 23, wherein, to identify the subset of the plurality of different representations based on the context corresponding to the vehicle in the environment, the one or more processors are configured to input the sensor data and the context into one or more trained machine learning models that output an indication of the subset of the plurality of different representations.

Aspect 25. The apparatus of Aspect 24, wherein the one or more processors are configured to: identify a reaction of the vehicle in response to receiving the enhanced representation of the environment; and update the one or more trained machine learning models using the context, the subset of the plurality of different representations, and the reaction as training data.

Aspect 26. The apparatus of any of Aspects 1 to 25, wherein, to obtain the sensor data of the environment from the one or more sensors, the one or more processors are configured to obtain the sensor data of the environment from the one or more sensors using at least one of a receiver, a transceiver, and/or a communication interface.

Aspect 27. The apparatus of any of Aspects 1 to 26, wherein, to obtain the sensor data of the environment from the one or more sensors, the one or more processors are configured to obtain the sensor data of the environment from at least one device that includes at least one of the one or more sensors.

Aspect 28. The apparatus of Aspect 27, wherein the at least one device is non-co-located with the apparatus.

Aspect 29. The apparatus of any of Aspects 1 to 28, wherein, to obtain the sensor data of the environment from the one or more sensors, the one or more processors are configured to obtain the sensor data of the environment from a plurality of devices that include at least one of the one or more sensors.

Aspect 30. The apparatus of Aspect 29, wherein the plurality of devices are non-co-located with one another.

Aspect 31. The apparatus of any of Aspects 1 to 30, wherein, to identify the subset of the plurality of different representations of the one or more portions of the environment based on the context, the one or more processors are configured to identify the subset of the plurality of different representations of the one or more portions of the environment without any user input.

Aspect 32. The apparatus of any of Aspects 1 to 31, wherein, to identify the subset of the plurality of different representations of the one or more portions of the environment based on the context, the one or more processors are configured to identify the subset of the plurality of different representations of the one or more portions of the environment based on a selection by a user using a user interface.

Aspect 33. The apparatus of any of Aspects 1 to 32, wherein, to identify the subset of the plurality of different representations of the one or more portions of the environment based on the context, the one or more processors are configured to identify the subset of the plurality of different representations of the one or more portions of the environment based on preference associated with a user.

Aspect 34. The apparatus of any of Aspects 1 to 33, wherein at least a first representation of the plurality of different representations is received from a first vehicle, and wherein at least a second representation of the plurality of different representations is received from a second vehicle.

Aspect 35. The apparatus of any of Aspects 1 to 34, wherein at least a first representation of the plurality of different representations is received from a first vehicle, and wherein at least a second representation of the plurality of different representations is received from at least one of a roadside unit (RSU), a multi-access edge computing (MEC) system, or a traffic management controller (TMC).

Aspect 36. The apparatus of any of Aspects 1 to 35, wherein at least a first representation of the plurality of different representations is received from a first roadside unit (RSU), and wherein at least a second representation of the plurality of different representations is received from a second RSU.

Aspect 37. The apparatus of any of Aspects 1 to 36, wherein at least a first representation of the plurality of different representations is received from the vehicle, and wherein at least a second representation of the plurality of different representations is received from a second vehicle.

Aspect 38. The apparatus of any of Aspects 1 to 37, wherein at least a first representation of the plurality of different representations is received from the vehicle, and wherein at least a second representation of the plurality of different representations is received from at least one of a roadside unit (RSU), a multi-access edge computing (MEC) system, or a traffic management controller (TMC).

Aspect 39. The apparatus of any of Aspects 1 to 38, wherein the apparatus includes a computing device that is remote from the vehicle, and wherein the one or more processors are configured to: identify the vehicle in the environment before causing the enhanced representation of the environment for the vehicle to be generated; and send an indication of the enhanced representation of the environment to the vehicle.

Aspect 40. The apparatus of Aspect 39, wherein the computing device of the apparatus is one of a multi-access edge computing (MEC) system, a roadside unit (RSU) system, a remote server, or a vehicle computing device, wherein the vehicle computing device is part of a second vehicle in the environment.

Aspect 41. The apparatus of any of Aspects 1 to 39, wherein the apparatus includes a vehicle computing device of the vehicle, and wherein the one or more processors are configured to: output an indication of the enhanced representation of the environment using an output device of the vehicle.

Aspect 42. An method for imaging, the method comprising: obtaining sensor data of an environment from one or more sensors of at least one device, wherein the sensor data includes a plurality of different representations of one or more portions of the environment from a plurality of perspectives; identifying a subset of the plurality of different representations of the one or more portions of the environment based on context corresponding to a vehicle in the environment, wherein the context includes at least a position of the vehicle in the environment; and causing an enhanced representation of the environment for the vehicle to be generated at least in part based on consolidating the subset of the plurality of different representations.

Aspect 43. The method of Aspect 42, wherein identifying the subset of the plurality of different representations based on the context includes identifying one or more representations of a portion of the environment that includes the position of the vehicle.

Aspect 44. The method of any of Aspects 42 to 43, wherein the context includes a direction of travel of the vehicle in the environment, wherein identifying the subset of the plurality of different representations based on the context includes identifying one or more representations of a portion of the environment ahead of the vehicle in the direction of travel of the vehicle.

Aspect 45. The method of any of Aspects 42 to 44, wherein the context includes a speed of the vehicle in the environment, wherein identifying the subset of the plurality of different representations based on the context includes identifying one or more representations of a portion of the environment ahead of the vehicle, wherein a size of the portion of the environment is based on speed of the vehicle.

Aspect 46. The method of any of Aspects 42 to 45, wherein the context includes a planned movement of the vehicle in the environment, wherein identifying the subset of the plurality of different representations based on the context includes identifying one or more representations of a portion of the environment ahead of the vehicle according to the planned movement of the vehicle.

Aspect 47. The method of Aspect 46, further comprising: detecting an indicator light of the vehicle in the sensor data; and determining the planned movement of the vehicle based on detecting the indicator light of the vehicle in the sensor data, wherein the planned movement of the vehicle is a turn.

Aspect 48. The method of any of Aspects 46 to 47, further comprising: receiving an indication of the planned movement of the vehicle from the vehicle, wherein the planned movement of the vehicle is part of a planned route for the vehicle.

Aspect 49. The method of any of Aspects 42 to 48, wherein the context includes an object in the environment other than the vehicle, wherein to identifying the subset of the plurality of different representations based on the context includes identifying one or more representations of a portion of the environment that includes the object.

Aspect 50. The method of any of Aspects 42 to 49, further comprising: identifying, based on one or more planned movements of the vehicle, a risk of a collision between the vehicle and an object in the environment; and causing an alert that is based on the enhanced representation of the environment to be output at the vehicle, wherein the alert indicates the risk of the collision between the vehicle and the object.

Aspect 51. The method of any of Aspects 42 to 50, wherein the context includes a planned movement of an object in the environment other than the vehicle, wherein identifying the subset of the plurality of different representations based on the context includes identifying one or more representations of a portion of the environment ahead of the vehicle according to the planned movement of the object.

Aspect 52. The method of any of Aspects 42 to 51, wherein identifying the subset of the plurality of different representations based on the context includes identifying that confidence levels associated with each of the subset of the plurality of different representations exceed a confidence level threshold, wherein a confidence level of one of the plurality of different representations is associated with confidence that the one of the plurality of different representations representing a portion of the environment ahead of the vehicle.

Aspect 53. The method of Aspect 52, wherein the portion of the environment ahead of the vehicle includes the vehicle.

Aspect 54. The method of any of Aspects 52 to 53, wherein the confidence level is based on a resolution of the one of the plurality of different representations.

Aspect 55. The method of any of Aspects 52 to 54, wherein the confidence level is based on a level of illumination in the one of the plurality of different representations.

Aspect 56. The method of any of Aspects 52 to 55, wherein the confidence level is based on object detection using the one of the plurality of different representations.

Aspect 57. The method of any of Aspects 42 to 56, wherein receiving the sensor data of the environment includes receiving at least a portion of the sensor data that includes at least one of the plurality of different representations from a second vehicle in the environment.

Aspect 58. The method of any of Aspects 42 to 57, wherein receiving the sensor data of the environment includes receiving at least a portion of the sensor data that includes at least one of the plurality of different representations from a roadside unit (RSU) in the environment.

Aspect 59. The method of any of Aspects 42 to 58, wherein receiving the sensor data of the environment includes receiving at least a portion of the sensor data that includes at least one of the plurality of different representations from a camera in the environment.

Aspect 60. The method of any of Aspects 42 to 59, wherein the plurality of different representations include depth data captured using at least one depth sensor.

Aspect 61. The method of any of Aspects 42 to 60, wherein the plurality of different representations include image data captured using at least one image sensor.

Aspect 62. The method of any of Aspects 42 to 61, further comprising: receive traffic data from a traffic management controller, wherein the context includes at least a portion of the traffic data, wherein the portion of the traffic data is associated with at least a portion of the environment that includes the vehicle.

Aspect 63. The method of any of Aspects 42 to 62, wherein causing the enhanced representation of the environment for the vehicle to be generated at least in part based on consolidating the subset of the plurality of different representations includes fusing together at least two different representations of the subset of the plurality of different representations.

Aspect 64. The method of Aspect 63, wherein the at least two different representations include an image captured by an image sensor and a depth dataset captured by a depth sensor, and wherein fusing together the at least two different representations includes associating portions of the image with corresponding portions of the depth dataset that represent corresponding portions of the environment.

Aspect 65. The method of any of Aspects 42 to 64, wherein identifying the subset of the plurality of different representations based on the context corresponding to the vehicle in the environment includes inputting the sensor data and the context into one or more trained machine learning models that output an indication of the subset of the plurality of different representations.

Aspect 66. The method of Aspect 65, further comprising: identifying a reaction of the vehicle in response to receiving the enhanced representation of the environment; and updating the one or more trained machine learning models using the context, the subset of the plurality of different representations, and the reaction as training data.

Aspect 67. The method of any of Aspects 42 to 66, wherein obtaining the sensor data of the environment from the one or more sensors includes obtaining the sensor data of the environment from the one or more sensors using at least one of a receiver, a transceiver, and/or a communication interface.

Aspect 68. The method of any of Aspects 42 to 67, wherein obtaining the sensor data of the environment from the one or more sensors includes obtaining the sensor data of the environment from at least one device that includes at least one of the one or more sensors.

Aspect 69. The method of Aspect 68, wherein the at least one device is non-co-located with an apparatus that performs the method.

Aspect 70. The method of any of Aspects 42 to 69, wherein obtaining the sensor data of the environment from the one or more sensors includes obtaining the sensor data of the environment from a plurality of devices that include at least one of the one or more sensors.

Aspect 71. The method of Aspect 70, wherein the plurality of devices are non-co-located with one another.

Aspect 72. The method of any of Aspects 42 to 71, wherein identifying the subset of the plurality of different representations of the one or more portions of the environment based on the context includes identifying the subset of the plurality of different representations of the one or more portions of the environment without any user input.

Aspect 73. The method of any of Aspects 42 to 72, wherein identifying the subset of the plurality of different representations of the one or more portions of the environment based on the context includes identifying the subset of the plurality of different representations of the one or more portions of the environment based on a selection by a user using a user interface.

Aspect 74. The method of any of Aspects 42 to 73, wherein identifying the subset of the plurality of different representations of the one or more portions of the environment based on the context includes identifying the subset of the plurality of different representations of the one or more portions of the environment based on preference associated with a user.

Aspect 75. The method of any of Aspects 42 to 74, wherein at least a first representation of the plurality of different representations is received from a first vehicle, and wherein at least a second representation of the plurality of different representations is received from a second vehicle.

Aspect 76. The method of any of Aspects 42 to 75, wherein at least a first representation of the plurality of different representations is received from a first vehicle, and wherein at least a second representation of the plurality of different representations is received from at least one of a roadside unit (RSU), a multi-access edge computing (MEC) system, or a traffic management controller (TMC).

Aspect 77. The method of any of Aspects 42 to 76, wherein at least a first representation of the plurality of different representations is received from a first roadside unit (RSU), and wherein at least a second representation of the plurality of different representations is received from a second RSU.

Aspect 78. The method of any of Aspects 42 to 77, wherein at least a first representation of the plurality of different representations is received from the vehicle, and wherein at least a second representation of the plurality of different representations is received from a second vehicle.

Aspect 79. The method of any of Aspects 42 to 78, wherein at least a first representation of the plurality of different representations is received from the vehicle, and wherein at least a second representation of the plurality of different representations is received from at least one of a roadside unit (RSU), a multi-access edge computing (MEC) system, or a traffic management controller (TMC).

Aspect 80. The method of any of Aspects 42 to 79, wherein the method is performed by an apparatus that includes a computing device that is remote from the vehicle further comprising: identifying the vehicle in the environment before causing the enhanced representation of the environment for the vehicle to be generated; and sending an indication of the enhanced representation of the environment to the vehicle.

Aspect 81. The method of Aspect 80, wherein the computing device of the apparatus is one of a multi-access edge computing (MEC) system, a roadside unit (RSU) system, a remote server, or a vehicle computing device, wherein the vehicle computing device is part of a second vehicle in the environment.

Aspect 82. The method of any of Aspects 42 to 81, wherein the method is performed by an apparatus that includes a vehicle computing device of the vehicle, further comprising: outputting an indication of the enhanced representation of the environment using an output device of the vehicle.

Aspect 83: A non-transitory computer-readable medium having stored thereon instructions that, when executed by one or more processors, cause the one or more processors to: obtain sensor data of an environment from one or more sensors of at least one device, wherein the sensor data includes a plurality of different representations of one or more portions of the environment from a plurality of perspectives; identify a subset of the plurality of different representations of the one or more portions of the environment based on context corresponding to a vehicle in the environment, wherein the context includes at least a position of the vehicle in the environment; and cause an enhanced representation of the environment for the vehicle to be generated at least in part based on consolidating the subset of the plurality of different representations.

Aspect 84: The non-transitory computer-readable medium of Aspect 83, further comprising operations according to any of Aspects 2 to 41, and/or any of Aspects 43 to 82.

Aspect 85: An apparatus for image processing, the apparatus comprising: means for obtaining sensor data of an environment from one or more sensors of at least one device, wherein the sensor data includes a plurality of different representations of one or more portions of the environment from a plurality of perspectives; means for identifying a subset of the plurality of different representations of the one or more portions of the environment based on context corresponding to a vehicle in the environment, wherein the context includes at least a position of the vehicle in the environment; and means for causing an enhanced representation of the environment for the vehicle to be generated at least in part based on consolidating the subset of the plurality of different representations.

Aspect 86: The apparatus of Aspect 85, further comprising means for performing operations according to any of Aspects 2 to 41, and/or any of Aspects 43 to 82.

What is claimed is:

1. An apparatus for sensor data processing, the apparatus comprising:
at least one memory; and
one or more processors coupled to the at least one memory, the one or more processors configured to:
obtain sensor data of an environment from a plurality of sensors having a plurality of fields of view, each sensor of the plurality of sensors having a respective field of view from the plurality of fields of view, wherein the sensor data includes a plurality of different representations of one or more portions of the environment wherein a first sensor of the plurality of sensors is coupled to a vehicle in the environment;
identify a subset of the plurality of different representations of the one or more portions of the environment based on a context corresponding to the vehicle, wherein the context includes at least a position of the vehicle;
cause an enhanced representation of the environment for the vehicle to be generated at least in part based on combining the subset of the plurality of different representations, wherein the enhanced representation of the environment includes a representation of a portion of the environment corresponding to a combination of the plurality of fields of view;
identify that an obstacle is outside of a field of view of the first sensor and is at risk of collision with the vehicle based on the enhanced representation of the environment and on the vehicle maintaining a planned route;
identify a change to the planned route of the vehicle that is responsive to the enhanced representation of the environment; and
cause an alert to be output at the vehicle, wherein the alert is associated with the enhanced representation of the environment.

2. The apparatus of claim 1, wherein to identify the subset of the plurality of different representations based on the context, the one or more processors are configured to identify one or more representations of a portion of the environment that includes the position of the vehicle.

3. The apparatus of claim 1, wherein the context includes a direction of travel of the vehicle in the environment, wherein to identify the subset of the plurality of different representations based on the context, the one or more processors are configured to identify one or more representations of a portion of the environment ahead of the vehicle in the direction of travel of the vehicle.

4. The apparatus of claim 1, wherein the context includes a speed of the vehicle in the environment, wherein to identify the subset of the plurality of different representations based on the context, the one or more processors are configured to identify one or more representations of a portion of the environment ahead of the vehicle, wherein a size of the portion of the environment is based on speed of the vehicle.

5. The apparatus of claim 1, wherein the context includes a planned movement of the vehicle in the environment, wherein to identify the subset of the plurality of different representations based on the context, the one or more processors are configured to identify one or more representations of a portion of the environment ahead of the vehicle according to the planned movement of the vehicle.

6. The apparatus of claim 5, wherein the one or more processors are configured to:
receive an indication of the planned movement of the vehicle, wherein the planned movement of the vehicle is part of a planned route for the vehicle.

7. The apparatus of claim 1, wherein the one or more processors are configured to:
identify that an indicator light of the vehicle is activated; and
determine a planned movement of the vehicle based on the indicator light of the vehicle being activated, wherein the planned movement of the vehicle includes at least one of a turn or a lane change, and wherein the context includes the planned movement.

8. The apparatus of claim 1, wherein the context is associated with the obstacle in the environment, and wherein, to identify the subset of the plurality of different representations based on the context, the one or more processors are configured to identify one or more representations of a portion of the environment that includes the obstacle.

9. The apparatus of claim 1, wherein the planned route of the vehicle includes at least one of a deceleration, a stop, an acceleration, a turn, or a lane change.

10. The apparatus of claim 1, wherein, to identify the subset of the plurality of different representations based on the context, the one or more processors are configured to identify that confidence levels associated with each of the subset of the plurality of different representations exceed a confidence level threshold, wherein a confidence level of one of the plurality of different representations is associated with confidence that the one of the plurality of different representations representing a portion of the environment ahead of the vehicle.

11. The apparatus of claim 1, wherein, to receive the sensor data of the environment, the one or more processors are configured to receive at least a portion of the sensor data that includes at least one of the plurality of different representations from a second vehicle in the environment.

12. The apparatus of claim 1, wherein, to receive the sensor data of the environment, the one or more processors are configured to receive at least a portion of the sensor data that includes at least one of the plurality of different representations from a roadside unit (RSU) in the environment.

13. The apparatus of claim 1, wherein, to receive the sensor data of the environment, the one or more processors are configured to receive at least a portion of the sensor data that includes at least one of the plurality of different representations from a camera in the environment.

14. The apparatus of claim 1, wherein the plurality of different representations include depth data captured using at least one depth sensor.

15. The apparatus of claim 1, wherein the plurality of different representations include image data captured using at least one image sensor.

16. The apparatus of claim 1, wherein, to cause the enhanced representation of the environment for the vehicle to be generated at least in part based on consolidating the subset of the plurality of different representations, the one or more processors are configured to fuse together at least two different representations of the subset of the plurality of different representations.

17. The apparatus of claim 1, wherein the apparatus includes a computing device that is remote from the vehicle, and wherein the one or more processors are configured to:
identify the vehicle in the environment before causing the enhanced representation of the environment for the vehicle to be generated; and
send an indication of the enhanced representation of the environment to the vehicle.

18. The apparatus of claim 17, wherein the computing device of the apparatus is one of a multi-access edge computing (MEC) system, a roadside unit (RSU) system, a remote server, or a vehicle computing device, wherein the vehicle computing device is part of a second vehicle in the environment.

19. The apparatus of claim 1, wherein the apparatus includes a vehicle computing device of the vehicle, and wherein the one or more processors are configured to:
output an indication of the enhanced representation of the environment using an output device of the vehicle.

20. The apparatus of claim 1, wherein, to cause the alert to be output at the vehicle, the one or more processors are configured to cause the alert to be displayed via a user interface within the vehicle.

21. The apparatus of claim 1, wherein, to cause the alert to be output at the vehicle, the one or more processors are configured to:
send the alert to an autonomous vehicle control of the vehicle, wherein the planned route is associated with the autonomous vehicle control, wherein the change to the planned route of the vehicle is associated with the autonomous vehicle control.

22. The apparatus of claim 1, wherein the one or more processors are configured to:
plan movements of the vehicle associated with the change to the planned route of the vehicle.

23. A method for sensor data processing, the method comprising:
obtaining sensor data of an environment from a plurality of sensors having a plurality of fields of view, each sensor of the plurality of sensors having a respective field of view from the plurality of fields of view, wherein the sensor data includes a plurality of different representations of one or more portions of the environment, wherein a first sensor of the plurality of sensors is coupled to a vehicle in the environment;
identifying a subset of the plurality of different representations of the one or more portions of the environment based on a context corresponding to the vehicle, wherein the context includes at least a position of the vehicle;
causing an enhanced representation of the environment for the vehicle to be generated at least in part based on combining the subset of the plurality of different representations, wherein the enhanced representation of the environment includes a representation of a portion of the environment corresponding to a combination of the plurality of fields of view;
identify that an obstacle is outside of a field of view of the first sensor and is at risk of collision with the vehicle based on the enhanced representation of the environment and on the vehicle maintaining a planned route;
identifying a change to the planned route of the vehicle that is responsive to the enhanced representation of the environment; and causing an alert to be output at the vehicle, wherein the alert is associated with the enhanced representation of the environment.

24. The method of claim 23, wherein identifying the subset of the plurality of different representations based on the context includes identifying one or more representations of a portion of the environment that includes the position of the vehicle.

25. The method of claim 23, wherein the context includes a direction of travel of the vehicle in the environment, wherein identifying the subset of the plurality of different representations based on the context includes identifying one or more representations of a portion of the environment ahead of the vehicle in the direction of travel of the vehicle.

26. The method of claim 23, wherein the context includes a speed of the vehicle in the environment, wherein identifying the subset of the plurality of different representations based on the context includes identifying one or more representations of a portion of the environment ahead of the vehicle, wherein a size of the portion of the environment is based on speed of the vehicle.

27. The method of claim 23, wherein the context includes a planned movement of the vehicle in the environment, wherein identifying the subset of the plurality of different representations based on the context includes identifying one or more representations of a portion of the environment ahead of the vehicle according to the planned movement of the vehicle.

28. The method of claim 23, wherein the context is associated with the obstacle in the environment, and wherein identifying the subset of the plurality of different representations based on the context includes identifying one or more representations of a portion of the environment that includes the obstacle.

29. The method of claim 23, wherein identifying the subset of the plurality of different representations based on the context includes identifying that confidence levels associated with each of the subset of the plurality of different representations exceed a confidence level threshold, wherein a confidence level of one of the plurality of different representations is associated with confidence that the one of the plurality of different representations representing a portion of the environment ahead of the vehicle.

30. The method of claim 23, wherein receiving the sensor data of the environment includes receiving at least a portion of the sensor data that includes at least one of the plurality of different representations from a second vehicle in the environment.

31. The method of claim 23, wherein causing the enhanced representation of the environment for the vehicle to be generated at least in part based on consolidating the subset of the plurality of different representations includes fusing together at least two different representations of the subset of the plurality of different representations.

32. The method of claim 23, wherein the method is performed by an apparatus that includes a computing device that is remote from the vehicle, further comprising:
   identifying the vehicle in the environment before causing the enhanced representation of the environment for the vehicle to be generated; and
   sending an indication of the enhanced representation of the environment to the vehicle.

33. The method of claim 23, wherein the method is performed by an apparatus that includes a vehicle computing device of the vehicle, further comprising: outputting an indication of the enhanced representation of the environment using an output device of the vehicle.

* * * * *